US007213205B1

(12) United States Patent
Miwa et al.

(10) Patent No.: US 7,213,205 B1
(45) Date of Patent: May 1, 2007

(54) DOCUMENT CATEGORIZING METHOD, DOCUMENT CATEGORIZING APPARATUS, AND STORAGE MEDIUM ON WHICH A DOCUMENT CATEGORIZATION PROGRAM IS STORED

(75) Inventors: Shinji Miwa, Nirasaki (JP); Michihiro Nagaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 918 days.

(21) Appl. No.: 09/762,126

(22) PCT Filed: Jun. 2, 2000

(86) PCT No.: PCT/JP00/03625

§ 371 (c)(1),
(2), (4) Date: Feb. 2, 2001

(87) PCT Pub. No.: WO00/75810

PCT Pub. Date: Dec. 14, 2000

(30) Foreign Application Priority Data

Jun. 4, 1999 (JP) .................................. 11-158498
Jul. 27, 1999 (JP) .................................. 11-212501

(51) Int. Cl.
*G06F 17/00* (2006.01)
(52) U.S. Cl. ...................... 715/530; 715/513; 707/3; 707/5
(58) Field of Classification Search ............. 715/501.1, 715/513, 530, 526, 520, 517, 514, 532, 529; 707/3, 5
See application file for complete search history.

(56) References Cited

U.S. PATENT DOCUMENTS 5,442,778 A * 8/1995 Pedersen et al. ................ 707/5
5,461,698 A * 10/1995 Schwanke et al. ............ 706/20
5,488,725 A * 1/1996 Turtle et al. .................... 707/5
5,619,709 A * 4/1997 Caid et al. .................. 715/532

(Continued)

FOREIGN PATENT DOCUMENTS

JP          10-162012          6/1998

OTHER PUBLICATIONS

Zamir et al., "Web Document Clustering: A Feasibility Demonstration", Aug. 1998, ACM, Inc., pp. 46-54.*

(Continued)

*Primary Examiner*—Doug Hutton
*Assistant Examiner*—James H Blackwell
(74) *Attorney, Agent, or Firm*—Rosalio Haro

(57) ABSTRACT

A document categorizing apparatus includes a sentence analyzer 12 for analyzing a plurality of documents to detect titles thereof; a feature element extractor 13 for extracting feature elements from the titles detected by the sentence analyzer 12 from the respective documents; feature table generating means 14 for generating a feature table representing the relationships between the feature elements extracted from the title and the documents including the feature elements; a document categorizing unit 15 for categorizing the documents into a plurality of clusters according to semantic similarity on the basis of the content of the feature table; a categorization result storage unit 16 for storing the clusters created by the document categorization unit 15; a cluster merging unit 2 for performing a cluster merging process upon the clusters stored in the categorization result storage unit 6; and an output control unit 31 for outputting the result of the cluster merging process to a display unit 32.

21 Claims, 11 Drawing Sheets

U.S. PATENT DOCUMENTS

| | | | |
|---|---|---|---|
| 5,931,907 A * | 8/1999 | Davies et al. | 709/218 |
| 5,991,756 A * | 11/1999 | Wu | 707/3 |
| 6,233,571 B1 * | 5/2001 | Egger et al. | 707/2 |
| 6,243,724 B1 * | 6/2001 | Mander et al. | 715/526 |
| 6,330,576 B1 * | 12/2001 | Mochizuki et al. | 715/529 |
| 6,353,827 B1 * | 3/2002 | Davies et al. | 707/6 |
| 6,370,525 B1 * | 4/2002 | Kaufman | 707/3 |
| 6,463,430 B1 * | 10/2002 | Brady et al. | 707/3 |
| 2003/0046401 A1 * | 3/2003 | Abbott et al. | 709/228 |

OTHER PUBLICATIONS

"MetaCrawler/Husky Search/Grouper web site", downloaded Apr. 11, 2004 http://www.cs.washington.edu/research/projects/WebWare1/www/metacrawler, used as background material.*

Wong et al., "Improving Document Clustering by Utilizing Meta-Data", Jul. 7, 2003, used as background information.*

Q. He, "A Review of Clustering Algorithms as Applied in IR", Univ. of Ill. Urbana-Champaign, date unknown.*

Oren Zamir, Oren Etzioni, "Grouper: a dynamic clustering interface to Web search results," Computer Networks, vol. 31, No. 11-16, pp. 1361-1374, May 17, 1999.

Shiomi, et al., "Thesaurus wo mochiita Bunsho Data no Jidou Bunrui hou", Research Report of Information Processing Society of Japan (IPSJ), vol. 97, No. 4 (97-NL-117), pp. 99-104, (Japan) Jan. 20, 1997.

Zamir O. et al: "Web Document Clustering: A Feasibility Demonstration", SIGIR '98. Proceeding of the 21st Annual International ACM-SIGIR conference on Research and Development in Information Retrieval. Melbourne, Aug. 24-28, 1998, annual international ACM-SIGIR conference on Research and Development in information Ret, 1998, pp. 46-54, XP002949043 ISBN: 1-58113-015-5.

Willet P: "Recent Trends In Hierarchic Document Clustering: A Critical Review", Information Processing & Management, Elsevier, Barking, GB, vol. 24, No. 5, 1998, pp. 577-597, XP00573921, ISSN: 0306-4573.

Chang C-H et al: "Customizable multi-engine search tool with clustering", Computer Networks and ISDN Systems, North Holland Publishing. Amsterdam, NL, vol. 29, No. 8-13, Sep. 1, 1997, pp. 1217-1224, XP004095318, ISN: 0169-7552.

Zamir O; Etzioni O; Madani O; Karp R M: "Fast and Intuitive Clustering of Web Documents", Proceedings Of The Third International Conference On Knowledge Discovery And Data Mining, Aug. 17, 1997, pp. 287-290, XP002280255, Newport Beach, Ca, USA.

Crouch C. J. Ed—Chiaramella Y. Association For Computing Machinery: "A Cluster-Based Approach to Thesaurus Construction", Proceedings Of The International Conference On Research and Development In Information Retrieval. (SIGIR). Grenoble, Jun. 13-15, 1988, New York, ACM, US, vol. Conf. 11, Jun. 13, 1988, pp. 309-320, XP000295046.

Salton G. et al: "Term-Weighting Approaches In Automatic Text Retrieval", Information Processing & Management, Elsevier, Barking, GB, vol. 24, No. 5, 1988, pp. 513-523, Xp002035959, ISSN: 0306-4573.

* cited by examiner

T1 — Paper Cassette
A1 — The machine is equipped with a universal paper cassette in the standard configuration. The universal paper cassette can be replaced with a high-capacity paper cassette dedicated to supplying A4-size paper. In the standard configuration, 200 sheets of paper can be set on the tray. In addition
D1 — to the standard universal paper cassette, ...

T2 — Installation of Additional Memory
A2 — The memory of the laser printer can be extended by installing an additional memory. The extention of memory provides improvements such as a reduction in time needed for the operation of the personal computer. Note that the degree of improvement depends upon the environment in which the laser printer
D2 — is used. When image data is printed, installation of a ... Mb additional memory is recommended.

T3 — Installation of an Optical Interface Card
A3 — An optional interface card can be used to connect the printer directly to a network in this case, ...
D3

T4 — Switiching the Paper Setting Among "Tray", "Cassette" and "Auto".
A4 — When printing is performed using one of various applications, setting of the paper feeder and the paper size is necessary. Check that the paper guide clip on the paper cassette is located at a correct position
D4 — corresponding to the paper size. When the printer is used in an environment other than a network environment ...

T5 — Installation of an Additional Hard Disk Drive to Install Additional Fonts
A5 — Additional fonts can be installed by ... An optional font ROM can also be installed to do ...
D5 — When an additional hard disk drive is installed to install a commercially available font ...

T6 — Smear Created on Printer Paper
A6 — When a black smear is created in an end region of paper or on the back surface of paper, clean the fixing roller in the printer. Select "Printing for Cleaning" from the setting menu provided on the panel of the printer and perform printing for cleaning on A4-size cleaning paper. Thereafter, ...
D6 — It is recomended to clean the fixing roller periodically in addition to the cleaning performed after replacing the cartridge. Reproduced paper can be used for the purpose of protecting natural environments.

T7 — Installation of an Additional Paper Cassette
A7 —     Up to two optional double cassette units or high-capacity paper cassette units dedicated to supplying A4-size paper can be installed.
    When two double cassette units are added, it becomes possible to ...
D7 — The A3 universal paper cassette can be replaced with ...to ...

FIG. 2

| Feature Element | Document D1 | Document D2 | Document D3 | Document D4 | Document D5 | Document D6 | Document D7 |
|---|---|---|---|---|---|---|---|
| Paper | 1 | | | 1 | | 1 | 1 |
| Cassette | 1 | | | 1 | | | 1 |
| Installation | | 1 | 1 | | 1 | | 1 |

FIG. 4

| Feature Element | Cluster |
|---|---|
| Paper | D1, D4, D6, D7 |
| Cassette | D1, D4, D7 |
| Installation | D2, D3, D5, D7 |

FIG. 5

| Cluster C1 | D1, D2, D3, D4, D8 |
|---|---|
| Cluster C2 | D3, D4, D5, D6, D7, D8 |

FIG. 6

| Feature Element | Cluster |
|---|---|
| Paper+Cassette | D1, D4, D6, D7 |
| Installation | D2, D3, D5, D7 |

FIG. 7

T1 — * Paper Cassette
A1 —    The machine is equipped with a universal paper cassette in the standard configuration. The universal paper cassette can be replaced with a high-capacity paper cassette dedicated to supplying A4-size paper. In the standard configuration, 200 sheets of paper can be set on the tray.
D1

T2 — * Installation of Additional Memory
A2 —    The memory of the laser printer can be extended by installing an additional memory. The extention of memory provides improvements such as a reduction in time needed for the operation of the personal computer. Note that the degree of improvement depends upon ...
D2

T3 — * Installation of an Optical Interface Card
A3 —    An optional interface card can be used to connect the printer directly to a network in this case,......
D3

T4 — * Switching the Paper Setting Among "Tray", "Cassette" and "Auto".
A4 —    When printing is performed using one of various applications, setting of the paper feeder and the paper size is necessary. Check that the paper guide clip on the paper cassette is ...
D4

T5 — * Installation of an Additional Hard Disk Drive to Install Additional Fonts
A5 —    Additional fonts can be installed by ... An optional font ROM can also be installed to ...
D5

T6 — * Smear Created on Printer Paper
A6 —    When a black smear is created in an end region of paper or on the back surface of paper, clean the fixing roller in the printer. Select "Printing for Cleaning" from the setting menu provided on the panel of the printer and perform printing for cleaning on A4-size cleaning paper. Thereafter, ...
D6

T7 — * Installation of an Additional Paper Cassette
A7 —    Up to two optional double cassette units or high-capacity paper cassette units dedicated to supplying A4-size paper can be installed.
D7

FIG. 10

| Feature Element | Document D1 | Document D2 | Document D3 | Document D4 | Document D5 | Document D6 | Document D7 |
|---|---|---|---|---|---|---|---|
| Paper | 1 | | | 1 | | 1 | 1 |
| Cassette | 1 | | | 1 | | | 1 |
| Installation | | 1 | 1 | | 1 | | 1 |

FIG. 12

| Feature Element | Cluster |
|---|---|
| Paper | D1, D4, D6, D7 |
| Cassette | D1, D4, D7 |
| Installation | D2, D3, D5, D7 |

FIG. 13

| Cluster C1 | D1, D2, D3, D4, D8 |
|---|---|
| Cluster C2 | D3, D4, D5, D6, D7, D8 |

FIG. 14

| Feature Element | Cluster |
|---|---|
| Paper+Cassette | D1, D4, D6, D7 |
| Installation | D2, D3, D5, D7 |

| Cluster Name | Title Of Document |
|---|---|
| Paper Cassette | * Paper Cassette<br>* Switching the Paper Setting Among "Tray", "Cassette", "Auto"<br>* Smear Created on Printed Paper<br>* Installation of an Additional Paper Cassette |

FIG. 17

| Cluster Name | Title Of Document |
|---|---|
| Paper Cassette | * Paper Cassette<br>* Switching the Paper Setting Among "Tray", "Cassette", "Auto"<br>* Smear Created on Printed Paper<br>* Installation of an Additional Paper Cassette |

DOCUMENT CATEGORIZING METHOD, DOCUMENT CATEGORIZING APPARATUS, AND STORAGE MEDIUM ON WHICH A DOCUMENT CATEGORIZATION PROGRAM IS STORED

BACKGROUND OF THE INVENTION

BACKGROUND ART

The present invention relates to a document categorizing method, a document categorizing apparatus, and a storage medium including a document categorizing program stored thereon, for categorizing a large number of documents into a plurality of clusters according to semantic similarity.

In the art of categorizing a large number of documents into a plurality of clusters according to semantic similarity, it is known to extract feature elements from the respective documents and categorize the documents according to the extracted feature elements. One specific categorization method is to employ the whole of each document (the entire content of each document including a title and a body) as a target and extract feature elements from the entire contents of the respective documents. After that, the documents are categorized into a plurality of clusters on the basis of the extracted feature elements.

In the case where feature elements are extracted from the entire contents of the respective documents, very complicated processing is needed in morphological analysis and extraction of feature elements. Thus, when such processing is performed by a central processing unit (CPU) in an information processing apparatus, a large load is imposed upon the CPU. Documents generally include many expressions having no direct relationships with the purport thereof. Therefore, if documents are categorized according to feature elements extracted by searching the entire contents of the respective documents, the resultant categorization is often meaningless. That is, a large number of noise clusters are created.

One technique to solve the above problem is to first extract a title representing the purport of a document, then extract a feature element from the title, and finally categorize the document on the basis of the extracted feature element. It is thought that this technique allows documents to be correctly categorized according to the purport of the respective documents.

As described above, several techniques of categorizing documents into clusters are known.

However, even when documents are categorized into clusters on the basis of feature elements extracted from the titles of the documents, the number of resultant clusters often becomes too great for user to use the resultant information. For example, when a large number of clusters obtained as a result of categorization are compared with one another, many same documents can be included in different clusters. In such a case, a user has to search the large number of presented clusters to find desired information. This is very inconvenient for users.

In view of the above, it is an object of the present invention to provide a technique to recategorize a large number of categorized clusters into a simplified easily-understandable form by means of merging clusters.

BRIEF DESCRIPTION OF THE DRAWINGS

FIG. 2 shows examples of documents for illustration of the first embodiment of the present invention.

FIG. 4 illustrates an example of the content of a feature table representing the relationship between feature elements and documents.

FIG. 5 illustrates a result obtained by categorizing the documents on the basis of the feature table shown in FIG. 4.

FIG. 6 illustrates a process of merging two clusters, wherein examples of documents included in the respective clusters are shown.

FIG. 7 illustrates a result obtained by performing a cluster merging process upon the categorization result shown in FIG. 5.

FIG. 10 shows examples of documents for illustration of the second embodiment of the present invention.

FIG. 12 illustrates an example of the content of a feature table representing the relationship between feature elements and documents.

FIG. 13 illustrates a result obtained by categorizing the documents on the basis of the feature table shown in FIG. 12.

FIG. 14 illustrates a process of merging two clusters, wherein examples of documents included in the respective clusters are shown.

FIG. 15 illustrates a result obtained by performing a cluster merging process upon the categorization result shown in FIG. 13.

FIG. 16 shows an example of a categorization result which is displayed such that the cluster names of clusters which have been merged into a final cluster are represented in an AND form (that is, the respective cluster names are placed in a single horizontal line).

FIG. 17 shows an example of a categorization result which is displayed such that the cluster names of clusters which have been merged into a final cluster are represented in another AND form (that is, the respective cluster names are placed in different lines).

DISCLOSURE OF THE INVENTION

Figure 1:
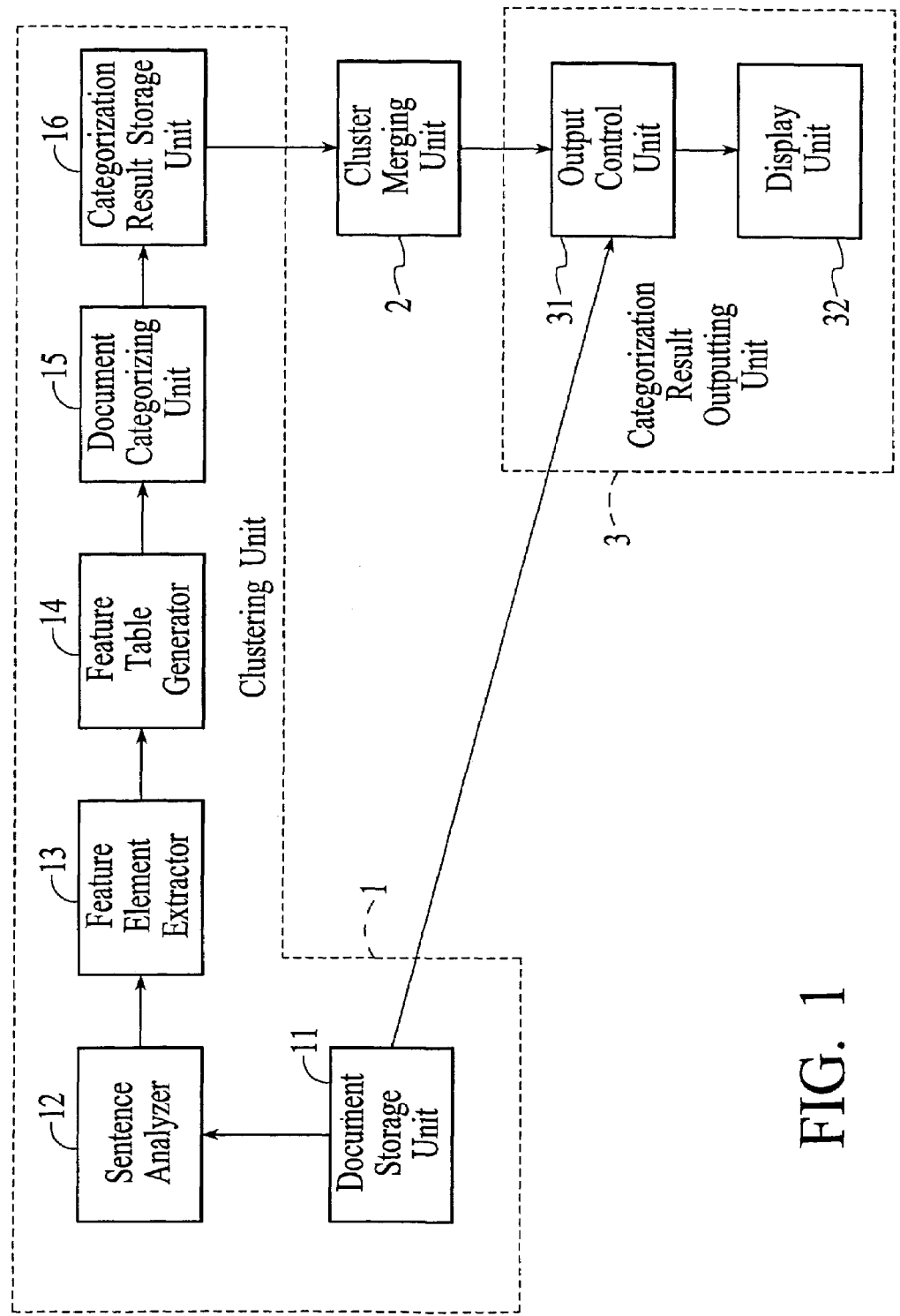
FIG. 1 is a block diagram illustrating a first embodiment of the present invention.

To achieve the object described above, the present invention provides a document categorizing method for categorizing a plurality of documents into a plurality of clusters according to semantic similarity, the method being characterized in that after categorizing the plurality of documents into a plurality of clusters according to semantic similarity, and a cluster merging process is performed such that relations among clusters of the plurality of clusters are evaluated on the basis of documents included in the respective clusters, and two or more clusters having a degree of relation equal to or higher than a predetermined value are combined together.

Preferably, the cluster merging process is performed such that the evaluation of relations among clusters under consideration as to whether they should be merged or not is performed on the basis of the number of documents commonly included in the clusters under consideration relative to the total number of documents included in the clusters under consideration, and cluster merging is performed in accordance with the evaluation result.

Alternatively, the cluster merging process may be performed such that in what manner feature elements, which characterize respective clusters under consideration as to whether they should be merged or not, appear in the respective clusters under consideration is examined, and cluster merging is performed in accordance with the manner in which the feature elements appear.

Preferably, The cluster merging process is performed at least for two clusters, and after completion of the cluster merging process a first time, the cluster merging process is performed repeatedly for the resultant set of clusters until no further cluster merging occurs.

Preferably, after completion of the cluster merging process, supplementary information indicating that cluster merging has been performed and also indicating the basis on which the cluster merging has been performed is output.

In the present invention, as described above, after categorizing documents into a plurality of clusters, the cluster merging process is performed such that relations among clusters of the plurality of clusters are evaluated on the basis of documents included in the respective clusters, and two or more clusters having a degree of relation equal to or higher than the predetermined value are combined together. Even when a large number of clusters have been generated in a first-time clustering process, the degrees of relations among the generated clusters are evaluated and clusters having high degrees of relations are combined together, and a simplified categorization result is presented to a user. This allows the user to find desired information in a highly efficient manner.

Because the evaluation of relations among clusters under consideration as to whether they should be merged or not is performed on the basis of the number of documents commonly included in the clusters under consideration relative to the total number of documents included in the clusters under consideration, the cluster merging process can be performed easily and correctly.

The evaluation of relations among clusters may be performed such that in what manner feature elements appear in the respective clusters under consideration as to whether they should be merged or not is examined, and cluster merging may be performed in accordance with the manner in which the feature elements appear. In this method, because the evaluation of the degree of relations among clusters is performed on the basis of the actual contents of documents, the cluster merging process can be performed in a more proper fashion.

The cluster merging process is performed for a combination of at least two clusters, and after completion of the cluster merging process, the cluster merging process is performed repeatedly for the set of clusters obtained in the previous cluster merging process until no further cluster merging occurs, thereby making it possible to obtain a simplified categorization result.

After completion of the cluster merging process, supplementary information indicating that cluster merging has been performed and also indicating the basis on which the cluster merging has been performed is output. Thus, a use can know in what manner the cluster merging process has been performed. This makes it possible for the user to use the supplementary information to find desired information from the result of the cluster merging process.

According to a second aspect of the present invention, there is provided a document categorizing method for categorizing a plurality of documents into a plurality of clusters according to semantic similarity, the method being characterized in that after categorizing the plurality of documents into a plurality of clusters according to semantic similarity, a cluster merging process is performed such that relations among clusters of the plurality of clusters are evaluated on the basis of documents included in the respective clusters, and two or more clusters having a degree of relation equal to or higher than a predetermined value are combined together; information representing which clusters have bee merged together and also representing the degrees of relation among the merged clusters is generated and the information is output together with the categorization result to be presented to a user so that when final clusters obtained as a result of the cluster merging process are displayed, the user can see in what manner the cluster merging process has been performed to obtain the final cluster.

Preferably, the information output so as to enable the user to see in what manner the cluster merging process has been performed is given by modifying the manner of displaying the cluster names of respective clusters merged together in accordance with the degree of relation among the clusters merged together in such a manner that when the degree of relation among the clusters is higher than a predetermined value, the cluster names are displayed in an AND form, however when the degree of relation among the clusters is lower than the predetermined value, the cluster names are displayed in an OR form.

Preferably, when the cluster names are displayed in the AND form, the cluster names of the respective clusters are displayed successively in a single horizontal line or the respective cluster names are displayed in different lines, while when the cluster names are displayed in the OR form, a delimiter is inserted between adjacent cluster names of the respective clusters.

When a certain cluster includes a cluster therein, the name of the cluster included in the certain cluster may be enclosed within brackets and placed after the name of the certain cluster.

In the present invention as described above, cluster-merging-process information is generated which represents which clusters have been merged together and also represents the degrees of relation among the merged clusters, and the cluster-merging-process information is displayed when final clusters obtained via the cluster merging process are displayed so that a user can see in what manner the cluster merging process has been performed to obtain the final cluster.

This makes it possible for the user to easily understand which clusters have been merged into which final clusters and can know the degrees of relations among the clusters merged together, simply by seeing the information displayed. The information output so as to enable the user to see what relations the clusters have is given by modifying the manner of displaying the cluster names of respective clusters merged together in accordance with the degrees of relations among the clusters merged together.

More specifically, when the degree of relation among clusters is higher than a predetermined value, the cluster names are displayed in an AND form, however when the degree of relation among the clusters is lower than the predetermined value, the cluster names are displayed in an OR form. For example, when the degree of relation is very high, the cluster names may be displayed successively in a single horizontal line or may be displayed in different lines such that one name is placed in one line. In the case where the degree of relation is not very high, a delimiter may be inserted between adjacent cluster names. When the user sees the cluster names displayed in one of the above manners, he/she can understand from which clusters the cluster has been created via the cluster merging process and can know the degree of the relation among the original clusters.

In the case where a certain cluster includes another cluster therein, the cluster name of the cluster included in the first cluster may be enclosed within brackets after the cluster name of the first cluster name. This allows the inclusive relation to be represented in a simple manner.

The present invention also provides a document categorizing apparatus for categorizing a plurality of documents into a plurality of clusters according to semantic similarity, the apparatus comprising a clustering unit for categorizing a plurality of documents into a plurality of clusters in accordance with semantic similarity, and a cluster merging unit which evaluates the relation among the plurality of clusters created by the clustering unit on the basis of the documents included in the respective clusters and then combines two or more clusters having a degree of relation equal to or higher than a predetermined value.

Furthermore, the present invention also provides another document categorizing apparatus for categorizing a plurality of documents into a plurality of clusters according to semantic similarity, the apparatus comprising a clustering unit for categorizing a plurality of documents into a plurality of clusters in accordance with semantic similarity, a cluster merging unit which evaluates the relation among the plurality of clusters created by the clustering unit on the basis of the documents included in the respective clusters and then combines two or more clusters having a degree of relation equal to or higher than a predetermined value, a cluster-merging-process information generator for generating cluster-merging-process information representing which clusters have been merged together and also representing the degrees of relation among the merged clusters wherein the cluster-merging-process information is to be displayed when final clusters obtained via the cluster merging process performed by the cluster merging unit are displayed so that a user can see in what manner the cluster merging process has been performed to obtain the final cluster, and categorization result outputting means for outputting the cluster-merging-process information such that the cluster-merging-process information is included in the categorization result to be presented to the user.

The present invention also provides a storage medium on which a document categorizing program for categorizing a plurality of documents into a plurality of clusters according to semantic similarity is stored, the document categorizing program comprising a clustering step for categorizing a plurality of documents into a plurality of clusters in accordance with semantic similarity, and a cluster merging step in which the degrees of relation among clusters of the plurality of clusters obtained in the clustering step are evaluated on the basis of documents included in the respective clusters, and two or more clusters having a degree of relation equal to or higher than a predetermined value are combined together.

Furthermore, the present invention provides another storage medium on which a document categorizing program for categorizing a plurality of documents into a plurality of clusters according to semantic similarity is stored, the document categorizing program comprising a clustering step for categorizing a plurality of documents into a plurality of clusters in accordance with semantic similarity, a cluster merging step in which the degrees of relation among clusters of the plurality of clusters obtained in the clustering step are evaluated on the basis of documents included in the respective clusters, and two or more clusters having a degree of relation equal to or higher than a predetermined value are combined together, a cluster-merging-process information generating step for generating cluster-merging-process information representing which clusters have been merged together and also representing the degrees of relation among the merged clusters wherein the cluster-merging-process information is to be displayed when final clusters obtained via the cluster merging process performed by the cluster merging unit are displayed so that a user can see in what manner the cluster merging process has been performed to obtain the final cluster, and a step for outputting the cluster-merging-process information such that the cluster-merging-process information is included in the categorization result to be presented to the user.

BEST MODE FOR CARRYING OUT THE INVENTION

First Embodiment

A first embodiment of the present invention is described below. Note that the technique described herein can be applied not only to a document categorizing method and a document categorization apparatus according to the present invention but also to a document categorization program stored on a storage medium according to the present invention.

In the present embodiment, titles are first extracted from respective documents, then feature elements are extracted from the titles, and finally the document is categorized according to the extracted feature elements.

FIG. 1 illustrates the structure of the apparatus according to the present embodiment. As shown in FIG. 1, the apparatus consists mainly of a clustering unit 1 for categorizing a plurality of documents into a plurality of clusters in accordance with semantic similarity, a cluster merging unit 2 which evaluates the relation among the plurality of clusters created by the clustering unit 1 on the basis of the documents included in the respective clusters and then combines two or more clusters having a degree of relation equal to or higher than a predetermined value, and a categorization result outputting unit 3 for outputting the categorization result obtained via the cluster merging process performed by the cluster merging unit 2.

The clustering unit 1 includes a document storage unit 11, a sentence analyzer 12, a feature element extractor 13, a feature table generator 14, a document categorizing unit 15, and a categorization result storage unit 16.

The cluster merging unit 2 serves to combine clusters, as will be described in detail later.

The categorization result outputting unit 3 includes an output control unit 31 and a display unit 32. The categorization result outputting unit 3 controls the process of outputting the result of the cluster merging process performed by the cluster merging unit 2. The document storage unit 11 included in the clustering unit 1 stores a large number of document data in a database. Hereinafter, it is assumed that documents shown in FIG. 2 are categorized. The documents shown in FIG. 2 include different documents D1, D2, . . . , D7 including titles T2, T2, . . . , T7 and main bodies A1, A1, . . . , A7, respectively.

The sentence analyzer 12 analyzes the documents stored in the document storage unit 11 to extract the titles of the respective documents. The extraction of the titles is performed by the document analyzer 12 as follows.

A first method is to detect a part defined as a title according to the document format, and employ the detected part as a title if such a part is detected. A second method is to detect a part specified to be displayed with characters having a greater size than a standard size, and employ the detected part as a title if such a part is detected. A third method is to extract a predetermined number of sentences or words described at the beginning of a document and employ the extracted sentence or words as a title. The first, second, and third methods described above are performed sequentially. When the first method is performed, if a part defined as a title is detected, the detected part is employed as the title. If a part defined as a title is not detected, the second method is performed. If a part specified to be displayed with large-sized characters is detected, the detected part is employed as the title. If a part specified to be displayed with large-sized characters is not detected, the third method is performed to detect a title.

The feature element extractor 13 extracts feature elements from the respective document titles detected by the sentence analyzer 2.

The feature table generating means 14 produces a feature table representing the relationship between the feature elements detected from the titles and the respective documents. A specific example of the content of the feature table will be described later.

The document categorizing unit 15 examines the content of the feature table and categorizes the documents D1, D2, ..., D7 into a plurality of clusters according to semantic similarity. More specifically, documents including a common feature element are detected on the basis of the feature elements included in the titles of the documents D1, D2, ..., D7, and the detected documents are categorized into a cluster. The document categorization unit 15 includes a synonymous feature dictionary (not shown). Categorization into clusters may also be performed using the synonymous feature dictionary as follows. When documents including a common feature element are detected, a judgment as to whether a common feature element is included or not is made by determining whether a synonym is included or not using the synonymous feature dictionary. If synonyms are detected in documents, those documents are categorized into the same cluster.

The categorization result storage unit 16 stores the content obtained via the categorization performed by the document categorization unit 15.

Figure 3:
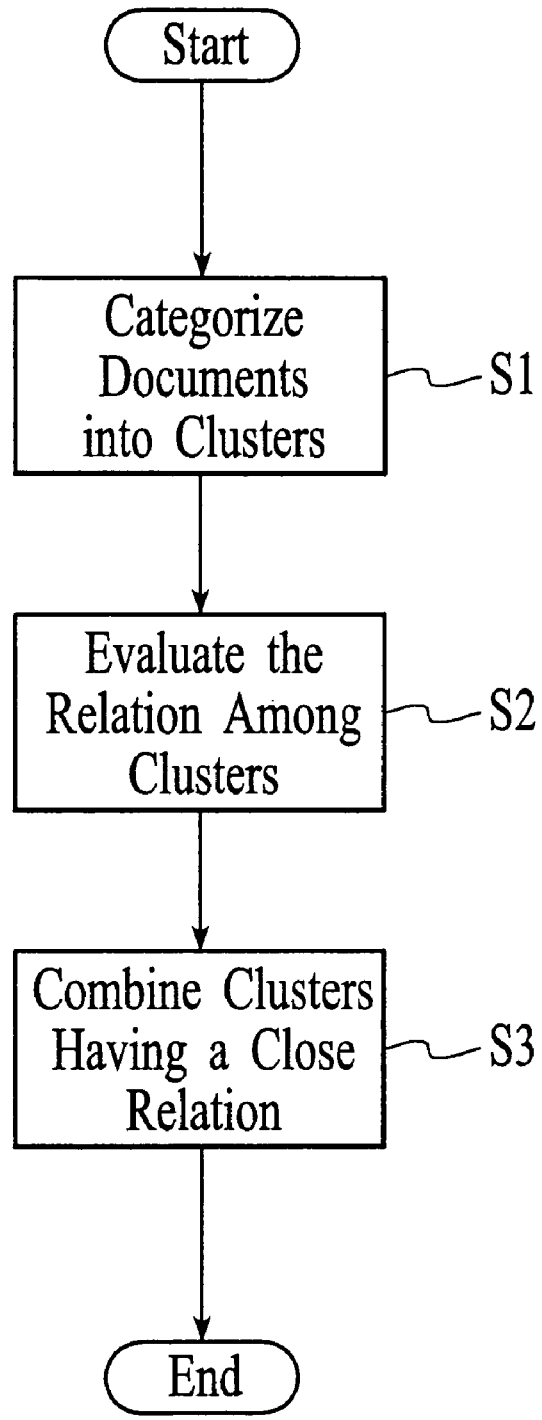
FIG. 3 is a flow chart illustrating the outline of a document categorization process according to the first embodiment of the present invention.

The document categorization process performed by the apparatus constructed in the above-described manner according to the present invention is described below. In the document categorization process according to the present embodiment, as shown in the flow chart of FIG. 3, a large number of documents to be processed are first categorized into a plurality of clusters according to semantic similarity (step S1). Thereafter, relations among the clusters are evaluated on the basis of the documents included in the respective clusters as will be described in detail later (step S2). Two or more clusters having a degree of relation higher than a predetermined level are combined together (step S3). The document categorization process is described in further detail below with reference to a specific example.

Herein, it is assumed that the documents D1, D2, ..., D7 shown in FIG. 2 are categorized. In the present embodiment, feature elements are extracted from the titles of the respective documents, and clustering is performed on the basis of the extracted feature elements. Thereafter, a cluster merging process is performed upon the result obtained through the above clustering process. First, the process of extracting feature elements from the titles and performing the clustering on the basis of the extracted feature elements (by the clustering unit 1) is described. The document analyzer 12 detects the titles of the respective documents D1, D2, ..., D7. For example, the title T1 is detected from the document D1, the title T2 from the document D2, the title T3 from the document D3, and so on. Thus, the titles T1, T2, ..., T7 are detected from the respective documents D1, D2, ..., D7.

The feature element extractor 13 then extracts feature elements from the respective titles. Thereafter, the feature table generator 14 produces a feature table representing the relationships between the feature elements and the documents including the feature elements in their titles. An example of a feature table is shown in FIG. 4. In this example, the feature table represents the relationship between feature elements each included in three or more different documents and the documents including the feature elements. Numerals described in the feature table represent the numbers of feature elements included in the respective documents. For example, in the case of feature element "paper", one feature element is included in the title of each of the documents D1, D4, D6, and D7.

As can be seen from the feature table shown in FIG. 4, documents including "paper" as a feature element in their title are D1, D4, D6, and D7, documents including "cassette" as a feature element in their title are D1, D4, and D7, and documents including "installation" as a feature element in their title are D2, D3, D5 and D7. In FIG. 2, these feature elements are underlined.

The document analyzer 15 access the feature table and categorizes the respective documents into clusters for each feature element. The result of the categorization is shown in FIG. 5. In the categorization into clusters, as described earlier, the detection of feature elements commonly included in documents may be performed by detecting synonyms included in documents, using the synonymous feature dictionary, and documents including detected synonyms may be categorized into the same document cluster. For example, when "paper" and "printing paper" are extracted as feature elements, documents including either one of these feature elements are categorized into the same cluster.

The obtained categorization result is stored in the categorization result storage unit 16. In the categorization result shown in FIG. 5, as for a cluster categorized as "paper" (including documents D1, D4, D6, and D7), as can be understood from the document contents shown in FIG. 2, a paper cassette is described in the content of the document D1, setting of paper in the document D4, a smear created on printed paper in the document D6, and installation of an additional paper cassette in the document D7.

Thus, the categorization of the documents D1, D4, D6, and D7 including a description about paper into the cluster can be regarded as proper.

In the case of a cluster categorized as "cassette" (including documents D1, D4, and D7), as can be understood from the document contents shown in FIG. 2, a paper cassette is described in the content of the document D1, setting of paper in the document D4, and installation of an additional paper cassette in the document D7.

The contents of the documents D1, D4, D6 and D7 include a description about setting of paper, and thus the categorization of these documents into the cluster can be regarded as proper.

In the case of a cluster categorized as "installation" (including documents D2, D3, D5, and D7), as can be understood from the document contents shown in FIG. 2, installation of an additional memory is described in the content of the document D2, installation of an interface card in the document D3, installation of an additional hard disk in the document D5, and installation of an additional paper cassette is in the document D7.

The contents of the documents D2, D3, D5 and D7 include a description about installation of an additional component, and thus the categorization of these documents into the cluster can be regarded as proper.

The reason why this technique allows documents to be properly categorized is that feature elements are first extracted from the titles of the respective documents, and then the documents are categorized on the basis of the extracted feature elements. That is, in most cases, the titles of documents represent, in a simplified fashion, what is described in the contents of the documents. Therefore, if categorization is performed using feature elements included in the titles of documents, scattering into a large number of clusters can be prevented, and the probability of generation of noise clusters is reduced. Furthermore, because the titles are created by the authors of the documents so as to shortly represent what is described in the documents, categorization on the basis of the author's viewpoints can be obtained.

After completion of categorization, if a user issues a command to select a cluster of "paper", documents D1, D4, D6, and D7 categorized in that cluster are read from the document storage unit 11 and displayed on the display unit 32. Herein, only the document numbers or document names may be displayed, or otherwise the contents of the documents may be displayed.

In the present invention, after the clustering process described above, the cluster merging unit 2 performs a cluster merging process.

That is, in the categorization result shown in FIG. 5, the cluster of "paper" includes documents D1, D4, D6, and D7, and the cluster of "cassette" includes documents D1, D4, and D7.

Thus, documents D1, D4, and D7 are included in both clusters of "paper" and "cassette". This means that a feature element of "paper" and a feature element of "cassette" have a close relation with each other. For example, an expression of "paper cassette" is included in the title or the main body of the documents D1, D4, and D7, and thus these documents D1, D4, and D7 can be regarded as having a close relation. Therefore, it is more desirable that these documents D1, D4, and D7 be categorized into the same cluster.

In the present invention, to the above end, after performing the clustering on the basis of the feature elements, the cluster merging process is performed upon the result of the clustering.

The cluster merging process is described below. First, aside from the categorization result shown in FIG. 5, a general example is described with reference to FIG. 6.

We assume here that there are two clusters C1 and C2, wherein the cluster C1 includes five documents D1, D2, D3, D4, and D8, and the cluster C2 includes six documents D3, D4, D5, D6, D7, and D8.

Documents which are commonly included in both clusters C1 and C2 are D3, D4, and D8. In the present embodiment, the degree of relation among a plurality of clusters is evaluated on the basis of the number of documents which are commonly included in the plurality of clusters, and clusters are merged depending upon the evaluated degree of relation.

More specifically, the ratio of the number of documents which are commonly included in two certain clusters to the total number of documents included in those two clusters is calculated, and a decision as to whether these two clusters should be merged is made depending upon whether the calculated ratio is equal to or greater than a predetermined threshold value.

In this specific example, the total number of documents included in the two clusters C1 and C2 is eleven, and three documents are commonly included in both clusters. Thus, the ratio (%) of the number of common documents to the total number of documents can be calculated, and the decision as to whether merging should be performed is made in accordance with the calculation result. In the calculation of the ratio (%), the ratio may be determined simply by dividing the number of common documents by the total number of documents and further multiplying the result by 100, or the ratio may be determined by dividing the product of the number of common documents and a predetermined arbitrary factor by the total number of documents and then multiplying the result by 100.

As an example, let us assume that the number of documents included in the cluster C1 is equal to $\alpha 1$, the number of documents included in the cluster C2 is equal to $\alpha 2$, and the number of documents which are commonly included in both clusters C1 and C2 is equal to $\beta$. After multiplying $\beta$ by a factor of, for example, 2, $2\beta/(\alpha 1+\alpha 2)\times 100$ is calculated. The result (%) is compared with a predetermined threshold value TH (%). If the calculated result is equal to or greater than the threshold value TH, then merging is performed. In the example shown in FIG. 6, $2\beta=2\times 3=6$, and $\alpha 1+\alpha 2=5+6=11$, and thus the ratio is calculated as 55%. If the threshold value TH is set to 70%, the calculated ratio (55%) is smaller than the threshold value TH (70%), and thus it is determined that the clusters C1 and C2 should not be merged. The above factor may be set to an arbitrary value such that the calculated ratio (%) falls within a range which is proper for comparison with the threshold value. Thus, although the factor is set to 2 in the above example, the factor may be set to 1.

Referring back to the categorization result shown in FIG. 5, the cluster of "paper" includes four documents D1, D4, D6, and D7, and the cluster of "cassette" includes three documents D1, D4, and D7. Three documents D1, D4, and D7 are commonly included in both clusters. Now, we calculate the ratio (%) of the number of common documents to the total number of documents.

The calculation is performed in accordance with the formula described above. In the case of the categorization result shown in FIG. 5, the total number of documents ($\alpha 1+\alpha 2$) is calculated as 4+3=7, the number of common documents is equal to 3, and thus $2\beta$ is calculated as 6. In this case, the ratio becomes as high as about 86%. Because the calculated ratio is greater than the predetermined threshold value (70% in this example), it is determined that the cluster of "paper" and the cluster of "cassette" should be merged into a single cluster.

Similarly, decisions as to whether the cluster of "paper" and the cluster of "installation" should be merged and whether the cluster of "cassette" and the cluster of "installation" should be merged are made as follows.

As for the clusters of "paper" and "installation", the cluster of "paper" includes four documents D1, D4, D6 and D7, and the cluster of "installation" includes four documents D2, D3, D5, and D7. Only one document D7 is commonly included in both clusters. Thus, according to the formula described above, the ratio is calculated as 25%, which is lower than the threshold value (70%). Therefore, it is determined that these clusters should not be merged.

As for the clusters of "cassette" and "installation", the cluster of "cassette" includes three documents D1, D4, and D7, the cluster of "installation" includes four documents D2, D3, D5, and D7, and only one document D7 is commonly included in both clusters. Thus, according to the formula described above, the ratio is calculated as 28%, which is also lower than the threshold value (70%). Therefore, it is determined that these clusters should not be merged.

As described above, it is determined whether merging should be performed for each combination of two clusters. The result of categorization (recategorization by merging) performed upon the categorization result shown in FIG. 5 is shown in FIG. 7. In FIG. 7, the cluster of "paper" and the cluster of "cassette" are combined into a single cluster of "paper+cassette" including documents D1, D4, D6, and D7. On the other hand, the cluster of "installation" remains in the original state without being combined with another cluster.

Referring to FIG. 7, the recategorization result obtained through the cluster merging process indicates that in the cluster "paper+cassette" (including documents D1, D4, D6, and D7), as can be understood from the document contents shown in FIG. 2, a paper cassette is described in the content of the document D1, setting of paper is described in the document D4, a method of handling which should be performed when printed paper becomes dirty is described in the document D6, and installation of an additional paper cassette is described in the document D7.

The contents of the documents D1, D4, D6 and D7 include a description about paper or a cassette, and thus the recategorization of these documents into the single cluster can be regarded as proper. As a matter of fact, merging into the single cluster of "paper+cassette" results in better categorization.

As described above, a better result can be obtained by first extracting feature elements from the titles of the respective documents, then performing the clustering process on the basis of the extracted feature elements, and finally performing the cluster merging process for each combination of two clusters of the clusters obtained via the above clustering process.

After the first cluster merging process for each combination of two clusters, the result of the recategorization by the cluster merging is obtained as shown in FIG. 7. Thereafter, a second cluster merging process is performed upon the recategorization result obtained through the first cluster merging process. That is, in the result of the first cluster merging process shown in FIG. 7, a cluster merging process is performed for a combination of the cluster of "paper+cassette" and the cluster of "installation". In this example, as for the combination of clusters of "paper+cassette" and "installation", the cluster "paper+cassette" includes four documents D1, D4, D6, the cluster of "installation" includes four document D2, D3, D5, and D7, and only one document D7 is included in both clusters. The ratio (%) of the number of common documents to the total number of documents is calculated as follows. The number of common document, equal to 1, is first multiplied by a factor of 2 and then divided by the total number of documents, equal to 8, and further multiplied by 100, and thus the result is obtained as 25%, which is lower than the threshold value (70%). Thus, it is determined that these clusters should not be merged.

As described above, after completion of the first cluster merging process for each combination of two clusters, the second cluster merging process is performed for each combination of two clusters of the clusters obtained via the fist cluster merging process. After completion of the second cluster merging process, a third cluster merging process is performed for each combination of two clusters of the clusters obtained via the second cluster merging process. The above process is performed repeatedly until no new cluster is created (until no clusters are merged).

Although in the above example, the cluster merging process is performed for a combination of two clusters, the cluster merging process may be performed for a combination of three or more clusters. In this case, in a first cluster merging process, cluster merging is performed for each combination of three or more clusters. Thereafter, cluster merging may be performed repeatedly for the result obtained via the previous cluster merging process until no further merging occurs. As in the previous case, the judgment as to whether three or more clusters should be merged can be performed on the basis of the ratio (%) of the number of common documents to the total number of documents included in these clusters.

Figure 8:
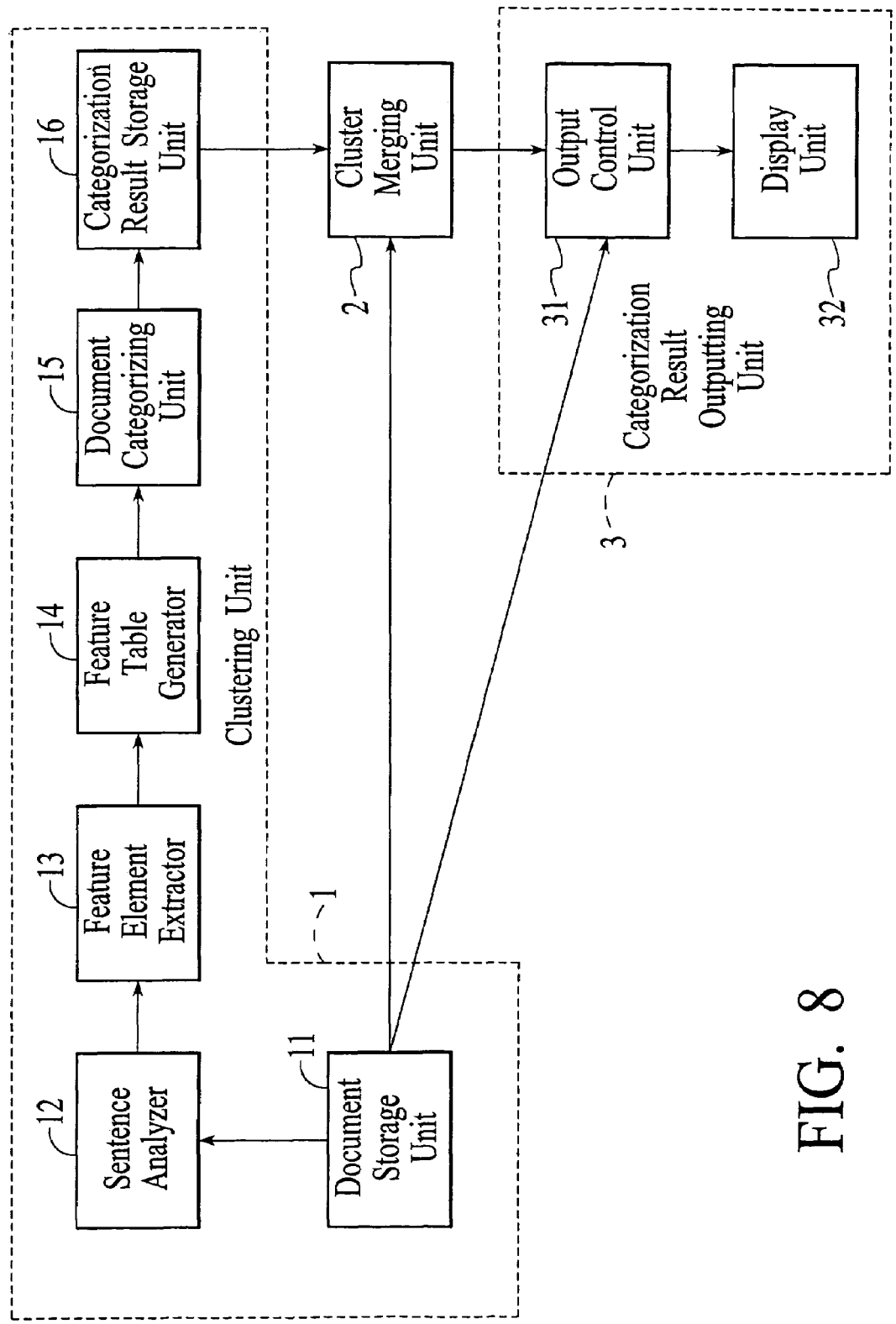
FIG. 8 is block diagram of a document categorizing apparatus which performs a cluster merging process in accordance with in what manner feature elements appear in original documents.

In the above-described cluster merging process for combinations of a plurality of clusters, the ratio of the number of documents commonly included in the clusters to the total number of documents is calculated from the categorization result such as that shown in FIG. 5, and the ratio is compared with the predetermined threshold value. Alternatively, the judgment as to whether clusters should be merged or not can be made by examining in what manner feature elements characterizing the respective clusters are used in the original documents. An example of an apparatus for performing the cluster merging process in the above-described manner is shown in FIG. 8. The apparatus shown in FIG. 8 is includes the same constituent parts as those shown in FIG. 1 and they are denoted by the same reference numerals. However, the difference is in that the output of the document storage unit 11 is applied to the cluster merging unit 2 so that the decision as to whether cluster merging should be preformed can be made on the basis of the document contents, as will be described below.

Herein, let us assume that the cluster merging process is performed for the clusters of "paper" and "cassette" shown in FIG. 5. The cluster of "paper" includes documents D1, D4, D6, and D7, and the cluster of "cassette" includes documents D1, D4, and D7.

These documents are examined to detect in what manner the words "paper" and "cassette" are used in the documents. In the document D1, a phrase "paper cassette" which is a combination of "paper" and "cassette" appears at plural locations. The document D4 also includes a phrase "paper cassette". Furthermore, in the document D4, "paper" and "cassette" appear at close locations. The document D7 also includes a phrase "paper cassette" and a phrase "paper cassette unit". Although the document D6 does not include a word "cassette", a word "paper" appears at plural locations.

Form the above, it can be concluded that words "paper" and "cassette" extracted as feature elements are used at adjacent or close locations, and thus they can be regarded as having a close relation. Thus, at least documents D1, D4, and D7 have a close relation, and the document D6 has a relation to some extent. Therefore, it can be concluded that the clusters of "paper" and "cassette" can be combined properly into a single cluster of "paper+cassette".

Thereafter, the cluster merging process is performed for the clusters of "paper" and "installation". The cluster of "paper" includes documents D1, D4, D6, and D7, and the cluster of "installation" includes documents D2, D3, D5, and D7.

These documents are examined to detect in what manner the words "paper" and "cassette" are used in the documents.

In the documents D1, D2, D3, D4, D5, and D6, "paper" and "installation" do not appear at adjacent or close locations. Only in the document D7, "paper cassette" and "installation" appear at close locations.

Therefore, it can be concluded that "paper" and "installation" extracted as feature elements are not frequently used at adjacent or close locations, and thus they can be regarded as having little relation. Thus, it is determined that the clusters of "paper" and "installation" should not be merged.

In the case of the cluster merging process for a combination of the clusters of "cassette" and "installation", as in the case of the combination of the clusters of "paper" and "installation", "cassette" and "installation" are not used at adjacent or close locations.

Therefore, it can be concluded that "cassette" and "installation" extracted as "feature elements" are not frequently used at adjacent or close locations, and thus they can be regarded as having little relation. Thus, it is determined that the clusters of "cassette" and "installation" should not be merged.

Also in the case where cluster merging is performed in the above-described manner depending upon in what manner feature elements characterizing the respective clusters are used in the original documents, after completion of a first cluster merging process for each combination of clusters, a second cluster merging process is performed for each combination of two clusters of the clusters obtained via the fist cluster merging process. After completion of the second cluster merging process, a third cluster merging process is performed for each combination of two clusters of the clusters obtained via the second cluster merging process. The above process is performed repeatedly until no further cluster is created (until no clusters are merged).

Although in the above example, the cluster merging process is performed for a combination of two clusters, the cluster merging process may be performed for a combination of three or more clusters. In this case, in a first cluster merging process, cluster merging is performed for each combination of three or more clusters. Thereafter, cluster merging may be performed repeatedly for the result obtained via the previous cluster merging process until no further merging occurs.

It is desirable that when the result obtained via the cluster merging process is presented to a user, information representing how the cluster merging process has been performed be also presented together with the above result to the user. This can be achieved if the information representing in what manner the cluster merging process has been performed by the cluster merging unit 2 is supplied to the output control unit 31, and the output control unit 31 displays the received information on the display unit 32.

Note that the present embodiment is not limited to the specific examples described above, but various modifications are possible without departing from the spirit of the embodiment. For example, although in the above example, feature elements to be used to obtain a categorization result such as that shown in FIG. 5 are extracted from the titles of the respective documents, and clustering is performed on the basis of the feature elements extracted from the titles, what is essential to the present embodiment is that after categorizing documents into clusters according to semantic similarity, similar clusters are merged. Therefore, the manner of clustering a plurality of documents is not limited to a particular method. For example, instead of clustering documents on the basis of feature elements extracted from the titles of the documents according to the above embodiment, clustering may also be performed according to URL addresses (after removing "http://", the remaining part is employed), updated date/time (without any restriction or within last one month), or file sizes (the sizes of the Web pages in bytes). One of these items or some combination of these items may be employed in the clustering process. A desired item can be selected, for example, from a menu. In the case where a selected item is not included in a document, another item may be employed instead of the selected item. For example, when the title is selected as the item, if a Web page does not include a title, a URL address may be employed.

After performing the clustering using one of the methods, the judgment as to whether clusters should be merged or not is made by evaluating the similarity between the clusters under consideration in the manner described above.

For example, let us consider an example in which clustering is performed according to URL addresses. We assume herein that documents have been categorized into a cluster of a certain URL (URL1) and a cluster of another URL (URL1). We further assume that the cluster of URL1 includes documents D1, D2, D3, and D4, and the cluster of URL2 includes documents D2, D3, D4, D5. In this case, documents which are commonly included in both clusters are D2, D3, and D4. The ratio of the number of common documents to the total number of documents is calculated, and it is determined according to the calculated ratio whether the cluster of URL1 and the cluster of URL2 should be merged or not.

Although in the above embodiment, the judgment as to whether clusters should be merged or not is made by comparing the ratio (%) of the number of documents commonly included in clusters under consideration to the total number of documents to a predetermined threshold value (%), the manner of the judgment is not limited to that. For example, the judgment as to whether clusters should be merged or not may be made in accordance with the number of common documents relative to the numbers of documents included in the respective clusters.

In the above embodiment, different documents D1, D2, ..., D7 are categorized. The embodiment may also be applied to the case where a single document is divided into a plurality of contents (into parts having their own themes) and the respective contents are categorized. Herein, let us assume that contents are given by dividing a single document at respective titles into plural parts each describing their own particular themes.

For example, if it is assumed that the documents D1, D2, ..., D7 shown in FIG. 7 are parts of the same single document, these documents D1, D2, ....., D7 can be regarded as contents in the above-described sense. In this case, the respective contents include titles T1, T2, ..., T7 and main bodies A1, A2, ..., A7.

As described above, the present embodiment may be applied to the case when a signal document is divided into a plurality contents, then the contents are categorized into clusters, and finally similar clusters in the obtained clusters are merged.

Furthermore, the present embodiment may also be applied to a plurality of documents obtained via a general retrieval service. In this case, the clustering process is first performed for a large number of documents obtained via the retrieval, and the cluster merging process is then performed for the result of the clustering process.

A program used to execute the above-described document categorizing process according to the present embodiment may be stored on a storage medium such as a floppy disk, an optical disk, or a hard disk. Note that such a storage medium also falls within the scope of the present invention. The program may also be obtained via a network.

Second Embodiment

When merged clusters are presented to a user, if only the final result of the cluster merging process is presented and no information about the cluster merging process is presented, the user cannot know which clusters have been combined together into final clusters and cannot know the degree of relation among the original clusters combined together into the final clusters.

In the present embodiment, to solve the above problem, when final clusters, which are obtained through the cluster merging process in which clusters having close relations are combined together, are displayed, the clusters are displayed in a manner that allows a user to see which clusters have been combined together into which final clusters and also see the degrees of relation among the clusters combined together.

The second embodiment of the present invention is described in further detail below.

In this second embodiment, categorization of documents is performed, as described above, by first extracting the titles of the respective documents, then extracting feature elements from the titles, and finally categorizing the documents on the basis of the extracted feature elements.

Figure 9:
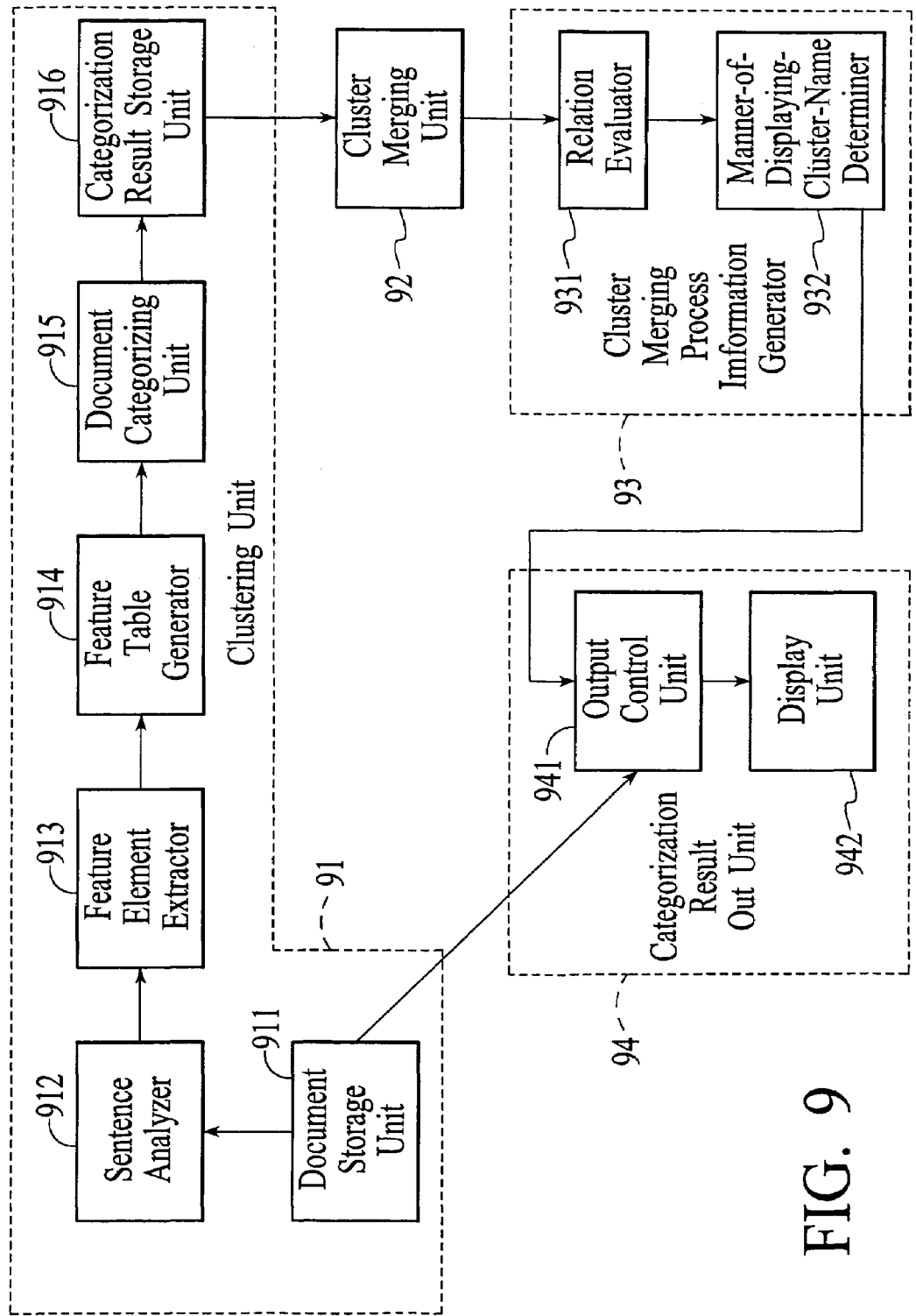
FIG. 9 is a block diagram illustrating a second embodiment of the present invention.

FIG. 9 illustrates the second embodiment. As shown in FIG. 9, an apparatus of the second embodiment consists mainly of a clustering unit 91 for categorizing documents into a plurality of clusters in accordance with semantic similarity, a cluster merging unit 92 which evaluates the relation among the plurality of clusters created by the clustering unit 91 on the basis of the documents included in the respective clusters and then combines two or more clusters having a degree of relation equal to or higher than a predetermined value, a cluster-merging-process information generator 93 for generating cluster-merging-process information representing which clusters have been combined together and also representing the degrees of relations among the combined clusters wherein the cluster-merging-process information is to be displayed when final clusters obtained via the cluster merging process performed by the cluster merging unit 2 are displayed, and a categorization result outputting unit 94 for outputting the categorization result including the cluster-merging-process information.

The clustering unit 91 includes a document storage unit 911, a sentence analyzer 912, a feature element extractor 913, a feature table generator 914, a document categorizing unit 915, and a categorization result storage unit 16.

The document storage unit 911 stores, in the form of a database, a large number of document data. Hereinafter, it is assumed that the documents shown in FIG. 10 are categorized. The documents shown in FIG. 10 include different documents D1, D2, . . . , D7 including titles T2, T2, . . . , T7 and main bodies A1, A1, . . . , A7, respectively.

The sentence analyzer 912 analyzes the documents stored in the document storage unit 911 to extract the titles of the respective documents. The extraction of the titles is performed by the document analyzer 912 as follows.

A first method is to detect a part defined as a title according to the document format, and employ the detected part as a title if such a part is detected. A second method is to detect a part specified to be displayed with characters having a greater size than a standard size, and employ the detected part as a title if such a part is detected. A third method is to extract a predetermined number of sentences or words located at the beginning of a document and employ the extracted sentence or words as a title. The first, second, and third methods described above are performed sequentially. When the first method is performed, if a part defined as a title is detected, the detected part is employed as the title. If a part defined as a title is not detected, the second method is performed. If a part specified to be displayed with large-sized characters is detected, the detected part is employed as the title. If a part specified to be displayed with large-sized characters is not detected, the third method is performed to detect a title.

The feature element extractor 913 extracts a feature element from the respective document titles detected by the sentence analyzer 2.

The feature table generating means 914 produces a feature table representing the relationship between the feature elements detected from the titles and the respective documents. A specific content of the feature table will be described later.

The document categorizing unit 915 examines the content of the feature table and categorizes the documents D1, D2, . . . , D7 into a plurality of clusters according to semantic similarity. Documents including a common feature element are detected on the basis of the feature elements included in the titles of the documents D1, D2, . . . , D7, and the detected documents are categorized into a cluster. The document categorization unit 915 includes a synonymous feature dictionary (not shown). Categorization into clusters may also be performed using the synonymous feature dictionary as follows. When documents including a common feature element are detected, a judgment as to whether a common feature element is included or not is made by determining whether a synonym is included or not using the synonymous feature dictionary. If synonyms are detected in documents, those documents are categorized into the same cluster.

The categorization result storage unit 916 stores the content obtained via the categorization performed by the document categorization unit 915.

The cluster merging unit 92 evaluates the relation among the plurality of clusters on the basis of the documents included in the respective clusters and then combines two or more clusters the degree of relation among which is equal to or higher than a predetermined value, as will be described in detail later.

The cluster-merging-process information generator 93 includes a relation evaluator 931 and a manner-of-displaying-cluster-name determiner 932, wherein the relation evaluator 931 evaluates the degree of relation among clusters by comparing a cluster correlation score (described later) generated by the cluster merging unit 92 with a predetermined threshold value (described later), and the manner-of-displaying-cluster-name determiner 932 determines the manner of displaying cluster names so as to indicate which clusters have been combined together and indicate the degree of relation among the combined clusters, on the basis of the degree of relation evaluated by the relation evaluator 931. The processing performed by the relation evaluator 931 and the manner-of-displaying-cluster-name determiner 932 will be described in further detail later.

The categorization result output unit 94 includes an output control unit 941 and a display unit 942 and serves to output the document categorization result obtained according to the present invention.

Figure 11:
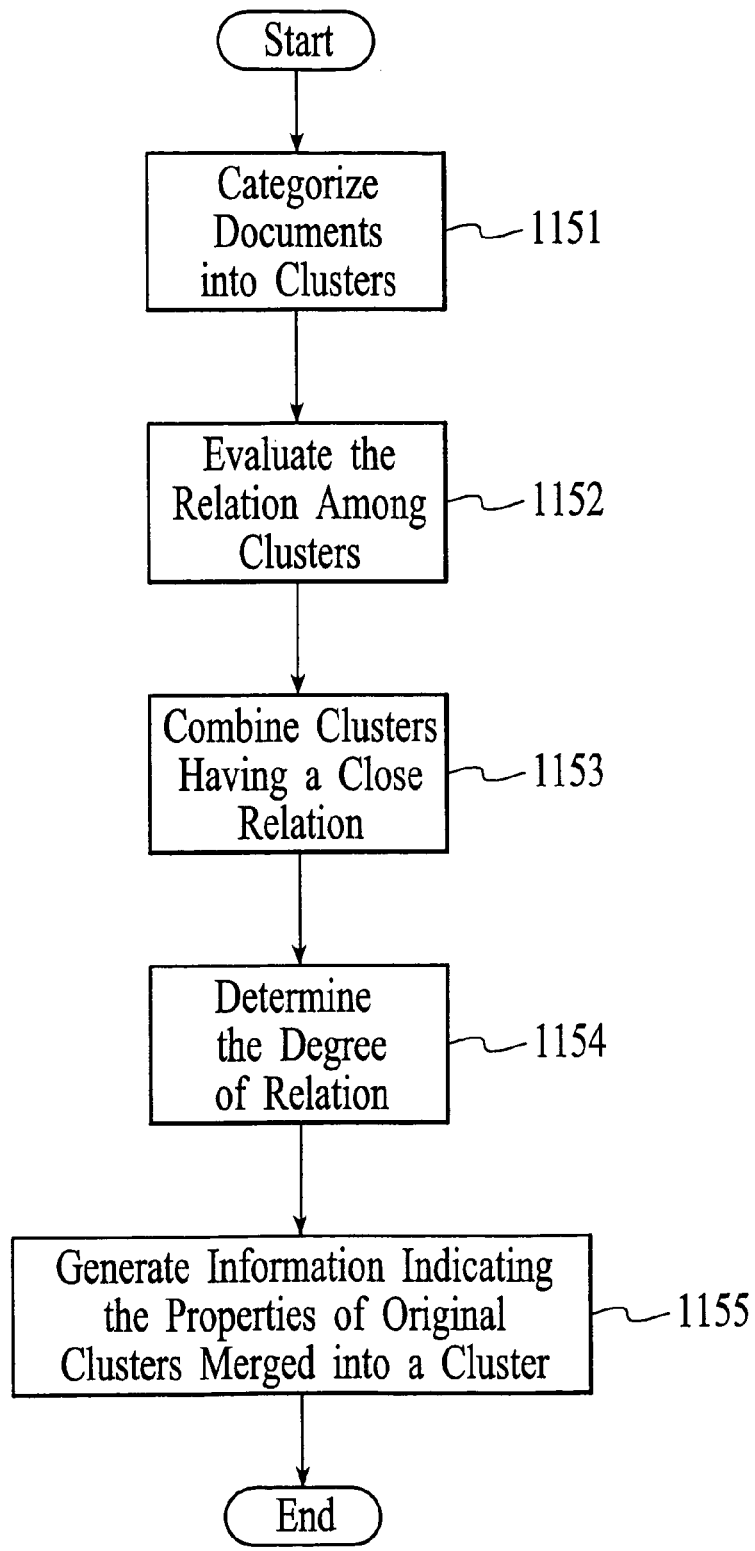
FIG. 11 is a flow chart illustrating the outline of a document categorization process according to the second embodiment of the present invention.

The document categorization process performed by the apparatus constructed in the above-described manner according to the present invention is described below. The outline of the document categorization process according to the present embodiment is as follows. As shown in a flow chart in FIG. 11, a large number of documents to be processed are first categorized into a plurality of clusters according to semantic similarity (step 11S1). Thereafter, the degrees of relation among clusters are evaluated on the basis of the documents included in the respective clusters (step 11S2). Two or more clusters having a degree of relation higher than a predetermined value are combined together (step 11S3). Thereafter, cluster-merging-process information is generated which indicates which clusters have been merged into final clusters and also indicates the degrees of relation among the original clusters combined together. More specifically, the degrees of relation among the clusters which have been merged are determined (step 11S4), and cluster-merging-process information is generated on the basis of the degrees of relation so that the cluster-merging-process information represents the properties of the original clusters combined together into the final clusters, that is, so that the cluster-merging-process information indicates which clusters have been combined together into final clusters and also indicates the degrees of relation among the original clusters combined together (step 11S5). The document categorization process is described in further detail below with reference to a specific example.

Herein, it is assumed that the documents D1, D2, . . . , D7 shown in FIG. 10 are categorized. In the present embodiment, feature elements are extracted from the titles of the respective documents, and clustering is performed on the basis of the extracted feature elements. Thereafter, obtained clusters are merged. First, the process of extracting feature elements from the titles and performing the clustering on the basis of the extracted feature elements (by the clustering unit 1) is described.

The document analyzer 12 detects the titles of the respective documents D1, D2, . . . , D7. For example, the title T1 is detected from the document D1, the title T2 from the document D2, the title T3 from the document D3, and so on. Thus, the titles T1, T2, . . . , T7 are detected from the respective documents D1, D2, . . . , D7.

The feature element extractor 913 then extracts feature elements from the respective titles. Thereafter, the feature table generator 914 produces a feature table representing the relationships between the feature elements and the documents including the feature element in their titles. An example of a feature table is shown in FIG. 12. In this example, the feature table represents the relationships between feature elements each included in three or more different documents and the documents including the feature elements. Numerals described in the feature table represent the numbers of feature elements included in the respective documents. For example, in the case of feature element "paper", one feature element is included in the title of each of the documents D1, D4, D6, and D7.

As can be seen from the feature table shown in FIG. 12, documents including "paper" as a feature element in their title are D1, D4, D6, and D7, documents including "cassette" as a feature element in their title are D1, D4, and D7, and documents including "installation" as a feature element in their title are D2, D3, D5 and D7. In FIG. 10, these feature elements are underlined.

The document analyzer 915 access the feature table and categorizes the respective documents into clusters for each feature element. The result of the categorization is shown in FIG. 13. In the categorization into clusters, as described earlier, the detection of feature elements commonly included in documents may be performed by detecting synonyms included in documents, using the synonymous feature dictionary, and documents including detected synonyms may be categorized into the same document cluster. For example, when "paper" and "printing paper" are extracted as feature elements, documents including either one of these feature elements are categorized into the same cluster.

The obtained categorization result is stored in the categorization result storage unit 916. In the categorization result shown in FIG. 13, as for a cluster categorized as "paper" (including documents D1, D4, D6, and D7), as can be understood from the document contents shown in FIG. 10, a paper cassette is described in the content of the document D1, setting of paper in the document D4, a smear created on printed paper in the document D6, and installation of an additional paper cassette in the document D7.

Thus, the categorization of the documents D1, D4, D6, and D7 including a description about paper into the cluster can be regarded as proper.

In the case of a cluster categorized as "cassette" (including documents D1, D4, and D7), as can be understood from the document contents shown in FIG. 10, a paper cassette is described in the content of the document D1, setting of paper in the document D4, and installation of an additional paper cassette in the document D7.

The contents of the documents D1, D4, D6 and D7 include a description about setting of paper, and thus the categorization of these documents into the cluster can be regarded as proper.

In the case of a cluster categorized as "installation" (including documents D2, D3, D5, and D7), as can be understood from the document contents shown in FIG. 10, installation of extension memory is described in the content of the document D2, installation of an interface card in the document D3, installation of an additional hard disk in the document D5, and installation of an additional paper cassette in the document D7.

The contents of the documents D2, D3, D5 and D7 include a description about installation of an additional part, and thus the categorization of these documents into the cluster can be regarded as proper.

The reason why this technique allows documents to be properly categorized is that feature elements are first extracted from the titles of the respective documents, and then the documents are categorized on the basis of the extracted feature elements. That is, in most cases, the titles of documents represent, in a simplified fashion, what is described in the contents of the documents. Therefore, if categorization is performed using feature elements included in the titles of documents, scattering into a large number of clusters can be prevented, and the probability of generation of noise clusters is reduced. Furthermore, because the titles are created by the authors of the documents so as to shortly represent what is described in the documents, categorization on the basis of the author's viewpoints can be obtained.

After completion of categorization, if a user issues a command to select a cluster of "paper", documents D1, D4, D6, and D7 categorized in that cluster are read from the document storage unit 11 and displayed on the display unit 32.

Herein, only the document numbers or document names may be displayed, or otherwise the contents of the documents may be displayed.

In the present invention, after the clustering described above, the cluster merging unit 2 performs a cluster merging process.

That is, in the categorization result shown in FIG. 13, the cluster of "paper" includes documents D1, D4, D6, and D7, and the cluster of "cassette" includes documents D1, D4, and D7.

Thus, documents D1, D4, and D7 are included in both clusters of "paper" and "cassette". This means that a feature element of "paper" and a feature element of "cassette" have a close relation with each other. For example, an expression of "paper cassette" is included in the title or the main body of the documents D1, D4, and D7, and thus these documents D1, D4, and D7 can be regarded as having a close relation. Therefore, it is more desirable that these documents D1, D4, and D7 be categorized into the same cluster.

To the above end, after performing the clustering on the basis of the feature elements, the cluster merging process is performed upon the result of the clustering.

The cluster merging process is described below. First, aside from the categorization result shown in FIG. 13, a general example is described with reference to FIG. 14.

We assume here that there are two clusters C1 and C2, wherein the cluster C1 includes five documents D1, D2, D3, D4, and D8, and the cluster C2 includes six documents D3, D4, D5, D6, D7, and D8.

Documents which are commonly included in both clusters C1 and C2 are D3, D4, and D8. In the present embodiment, the degree of relation among a plurality of clusters is evaluated on the basis of the number of documents which are commonly included in the plurality of clusters, and clusters are merged depending upon the evaluated degree of relation.

More specifically, the ratio of the number of documents which are commonly included in two certain clusters to the total number of documents included in those two clusters is calculated, and a decision as to whether these two clusters should be merged is made depending upon whether the calculated ratio is equal to or greater than a predetermined threshold value.

In this specific example, the total number of documents included in the two clusters C1 and C2 is eleven, and three documents are commonly included in both clusters. Thus, the ratio (%) of the number of common documents to the total number of documents can be calculated, and the decision as to whether merging should be performed is made in accordance with the calculation result. When the ratio (%) is calculated, the ratio may be determined simply by diving the number of common documents by the total number of documents and further multiplying the result by 100, or the ratio may be determined by dividing the product the number of common documents and a predetermined arbitrary factor by the total number of documents and then multiplying the result by 100.

As an example, let us assume that the number of documents included in the cluster C1 is equal to $\alpha 1$, the number of documents included in the cluster C2 is equal to $\alpha 2$, and the number of documents which are commonly included in both clusters C1 and C2 is equal to $\beta$. After multiplying $\beta$ by a factor of, for example, 2, and then $2\beta/(\alpha 1+\alpha 2) \times 100$ is calculated. The result (%) is compared with a predetermined threshold value TH (%). If the calculated result is equal to or greater than the threshold value TH, then merging is performed. In the example shown in FIG. 14, $2\beta=2\times 3=6$, and $\alpha 1+\alpha 2=5+6=11$, and thus the ratio is calculated as 55%. If the threshold value TH is set to 70%, the calculated ratio (55%) is smaller than the threshold value TH (70%), and thus it is determined that the clusters C1 and C2 should not be merged. The above factor may be set to an arbitrary value such that the calculated ratio (%) falls within a range which is proper for comparison with the threshold value. Thus, although the factor is set to 2 in the above example, the factor may be set to 1.

Referring back to the categorization result shown in FIG. 13, In this example, the cluster of "paper" includes four documents D1, D4, D6, and D7, and the cluster of "cassette" includes three documents D1, D4, and D7. Three documents D1, D4, and D7 are commonly included in both clusters. Now, we calculate the ratio (%) of the number of common documents to the total number of documents.

The calculation is performed in accordance with the formula described above. In the case of the categorization result shown in FIG. 13, the total number of documents $(\alpha 1+\alpha 2)$ is calculated as 4+3=7, the number of common documents is equal to 3, and thus $2\beta$ is calculated as 6. In this case, the ratio becomes as high as about 86%. Because the calculated ratio is greater than the predetermined threshold value (70% in this example), it is determined that the cluster of "paper" and the cluster of "cassette" should be merged into a single cluster.

Similarly, decisions as to whether the cluster of "paper" and the cluster of "installation" shown in FIG. 13 should be merged and whether the cluster of "cassette" and the cluster of "installation" should be merged are made as follows.

As for the clusters of "paper" and "installation", the cluster of "paper" includes four documents D1, D4, D6, and D7, the cluster of "installation" includes four documents D2, D3, D5, and D7, and only one document D7 is included in both clusters. Thus, according to the formula described above, the ratio is calculated as 25%, which is lower than the threshold value (70%). Therefore, it is determined that these clusters should not be merged.

As for the clusters of "cassette" and "installation", the cluster of "cassette" includes three documents D1, D4, and D7, the cluster of "installation" includes four documents D2, D3, D5, and D7, and only one document D7 is included in both clusters. Thus, according to the formula described above, the ratio is calculated as 28%, which is also lower than the threshold value (70%). Therefore, it is determined that these clusters should not be merged.

As described above, it is determined whether merging should be performed for each combination of two clusters. The result of categorization (recategorization by merging) performed upon the categorization result shown in FIG. 13 is shown in FIG. 15. In FIG. 15, the cluster of "paper" and the cluster of "cassette" are combined into a single cluster of "paper+cassette" including documents D1, D4, D6, and D7. On the other hand, the cluster of "installation" remains in the original state without being combined with another cluster.

Referring to FIG. 15, the recategorization result obtained through the cluster merging process indicates that in the cluster "paper+cassette" (including documents D1, D4, D6, and D7), as can be understood from the document contents shown in FIG. 10, a paper cassette is described in the content of the document D1, setting of paper in the document D4, a method of handling which should be performed when printed paper becomes dirty is described in the document D6, and installation of an additional paper cassette in the document D7.

The contents of the documents D1, D4, D6 and D7 include a description about paper or a cassette, and thus the recategorization of these documents into the single cluster can be regarded as proper. As a matter of fact, merging into the single cluster of "paper+cassette" results in better categorization.

As described above, a better result can be obtained by first extracting feature elements from the titles of the respective documents, and clustering is performed on the basis of the extracted feature elements, and finally performing the cluster merging process for each combination of two clusters of the clusters obtained via the above clustering process.

After the first cluster merging process for each combination of two clusters, the result of the recategorization by the cluster merging is obtained as shown in FIG. 15. Thereafter, a second cluster merging process is performed upon the recategorization result obtained through the first cluster merging process. That is, in the result of the first cluster merging process shown in FIG. 15, a cluster merging process is performed for a combination of the cluster of "paper+cassette" and the cluster of "installation". In this example, as for the combination of clusters of "paper+cassette" and "installation", the cluster "paper+cassette" includes four documents D1, D4, D6, the cluster of "installation" includes four document D2, D3, D5, and D7, and only one document D7 is included in both clusters. The ratio (%) of the number of common documents to the total number of documents is calculated as follows. The number of common document, equal to 1, is first multiplied by a factor of 2 and then divided by the total number of documents, equal to 8, and further multiplied by 100, and thus the result is obtained as 25%, which is lower than the threshold value (70%). Thus, it is determined that these clusters should not be merged.

After completion of the first cluster merging process for each combination of two clusters, a second cluster merging process is performed for each combination of two clusters of the clusters obtained via the fist cluster merging process. After completion of the second cluster merging process, a third cluster merging process is performed for each combination of two clusters of the clusters obtained via the second cluster merging process. The above process is performed repeatedly until no further cluster is created (until no clusters are merged).

Although in the above example, the cluster merging process is performed for a combination of two clusters, the cluster merging process may be performed for a combination of three or more clusters. In this case, in a first cluster merging process, cluster merging is performed for each combination of three or more clusters. Thereafter, cluster merging may be performed repeatedly for the result obtained via the previous cluster merging process until no further merging occurs. As in the previous case, the judgment as to whether three or more clusters should be merged can be performed on the basis of the ratio (%) of the number of common documents to the total number of documents included in these clusters.

After the cluster merging unit 92 shown in FIG. 9 completes the cluster merging process, the cluster-merging-process information generator 93 determines the degrees of relation among the original clusters merged together by the cluster merging unit 92 and generates cluster-merging-process information on the basis of the degrees of relation so that the cluster-merging-process information represents the properties of the original clusters combined together into the final clusters, that is, so that the cluster-merging-process information indicates which clusters have been combined together into final clusters and also indicates the degrees of relation among the original clusters combined together. The process performed by the cluster-merging-process information generator 93 is described in further detail below.

In the present embodiment, the relation evaluator 931 evaluates the degrees of relation among clusters merged together by determining whether the cluster correlation scores (%) calculated by the cluster merging unit 92 are much greater than the above-described threshold value TH or close to the threshold value TH. More specifically, a threshold value TH1 is set to a value (%) higher than the above-described threshold value TH, and if the cluster correlation score (denoted by K) calculated by the cluster merging unit 92 is equal to or higher than TH1 (K≧TH1, the clusters are determined as having very close relation, that is, as being very similar to each other. On the other hand, if the cluster correlation score K calculated by the cluster merging unit 92 is within a range TH1>K≧TH, the clusters are determined as being similar to each other to a certain extent.

If K≧TH1, that is, if clusters merged into a final cluster have been determined as having very close relation, the following process is further performed.

In the case of the specific example shown in FIG. 15, a final cluster created via the cluster merging process has a feature element of "paper+cassette". This cluster of "paper+cassette" is obtained as a result of merging the cluster of "paper" and the cluster of "cassette" shown in FIG. 13.

The clusters may be named as follows. For example, a cluster having a feature element of "paper" is named "paper cluster", and a cluster having a feature element of "cassette" is named "cassette cluster". Hereinafter, the cluster names are represented more simply as "paper" and "cassette".

The cluster correlation score of the cluster of "paper+cassette" created by the cluster merging process has been calculated as 86% by the cluster merging unit 92. Herein we assume that the threshold value TH1 used by the relation evaluator 931 to evaluate the degree of relation is set 80%. In this case, the cluster correlation score K calculated by the cluster merging unit 92 satisfies the condition K≧TH1, and thus the paper cluster and the cassette cluster are determined as having very close relation and being very similar to each other.

As described above, when a cluster correlation score K calculated by the cluster merging unit 92 is equal to or greater than TH1 (K≧TH1), original clusters merged together into a final cluster can be regarded as having very close relation and being very similar to each other. Thus, in such a case, the name of the final cluster is given by a combination of the original cluster names, which are displayed by successively listing the original cluster names. In the case of "paper cluster" and "cassette cluster", the cluster names "paper" and "cassette" can be combined into "paper cassette".

That is, in this case, the cluster names are displayed in an AND form. This method is employed when a simple combination of cluster names does not result in a problem. In this specific example, the final cluster created via the cluster merging process is named "paper cassette". The naming of the final cluster as "paper cassette" can be judged as proper from the contents of the documents (FIG. 10) in the paper cluster and the cassette clusters merged into the final cluster.

FIG. 16 illustrates an example of information displayed after the above process. In this specific example shown in FIG. 16, "paper cassette" is displayed as the cluster name of the final cluster created via the cluster merging process, and the title names of the documents (D1, D4, D6, D7, shown in FIG. 10) included in this cluster are displayed.

Instead of displaying the original cluster names successively in a single line as shown in FIG. 16, the individual original cluster names "paper" and "cassette" corresponding to the original clusters may be displayed in different adjacent lines as shown in FIG. 17.

In the case where the original cluster names are displayed in different lines, unnatural or incongruous linguistic continuity can be avoided. Although in this specific example, no problems occur when "paper" and "cassette" are combined and represented in a single line as "paper cassette", combining of cluster names into a single line can be incongruous depending upon the specific cluster names. For example, aside from the above example, when a final cluster is created by merging clusters having names of "product", "usage", "outline", if the cluster names is displayed successively in a single line, the result is "product usage outline". Although this is not absolutely unclear in meaning, it is somewhat incongruous in a linguistic sense. In such a case, language processing may be performed to obtain a better expression such as "outline of usage of products". However, the language processing would be complicated and a long processing time would be needed.

In this specific case, the incongruence can be avoided by displaying "product", "usage", and "outline" in different lines. Another advantage of displaying cluster names in different lines is that when a large number of clusters are combined together, displaying of cluster names in different lines prevents the cluster names from extending over a too long length along a horizontal line.

As described above, when the cluster correlation score K calculated by the cluster merging unit 92 satisfies the condition K≧TH1, the cluster names of original clusters merged into a final cluster are displayed in the AND form in which the original cluster names are arranged in a single horizontal line or displayed in different lines.

This makes it possible for the user to easily understand which clusters have been merged into a final cluster simply by seeing the cluster name of the final cluster. For example, in the case of the specific example shown in FIG. 16 or FIG. 17, it can be easily understood that the final cluster has been created by combining the original clusters having cluster names "paper" and "cassette" and that the original clusters have very close relation, that is, the documents included therein have similar contents.

When TH1>K≧TH, that is, when the degree of relation among original clusters which have been merged into a final cluster is not very high but some similar documents are included in the clusters, the process is performed as follows.

When the cluster correlation score K calculated by the cluster merging unit 92 is within the range TH1>K≧TH, the original cluster names are represented in an OR form.

In the specific example described above, the original cluster names "product", "usage", and "outline" are represented not in a simple successive fashion but in a fashion in which a delimiter is placed between adjacent cluster names such as "product-usage-outline". If a user is informed in advance that a delimiter placed between adjacent cluster names represents "OR", the user can understand that the final cluster obtained via the cluster merging process includes some documents having contents about "product", "usage", or "outline". When a final cluster name is represented in the OR form, the delimiter placed between original cluster names is not limited to a dot as is used in "produce-usage-outline" but other types of delimiters may be used. For example, "/" may be placed between original cluster names such as "product/usage/outline".

In some cases, the cluster correlation score K for some original clusters included in a final cluster is equal to or greater than TH1 (K≧TH1) but the cluster correlation score K for some other original clusters in the same final cluster is in the range TH1>K≧TH. In this case, the final cluster name is represented in the form of a mixture of AND and OR expressions so that the degrees of relation are indicated in the final cluster name.

In some cases, in a final cluster obtained by merging original clusters, some original clusters may be included in another original cluster. For example, when clusters having cluster names "product", "television" "radio", and "video" are merged together into a final cluster, if the respective clusters "television", "radio" and "video" are included in the cluster "product" and if the cluster correlation scores K are within the range TH1>K≧TH, the cluster name of the final cluster is expressed as "product-(television-radio-video)". The dots in this expression indicate that "product", "television", "radio", and "video" have relation of OR. Furthermore, the brackets enclosing therein "television", "radio", and "video" indicates that clusters "television", "radio", and "video" are included in the cluster "product".

As described above, only by seeing the cluster names of the final clusters obtained via the cluster merging process, it is possible to know which clusters have been combined together into which final clusters and also can know the degrees of relations among the original clusters combined together.

Note that the present embodiment is not limited to the specific examples described above, but various modifications are possible without departing from the spirit of the embodiment. For example, although in the above example, feature elements to be used to obtain a categorization result such as that shown in FIG. 13 are extracted from the titles of the respective documents, and clustering is performed on the basis of the feature elements extracted from the titles, the manner of clustering a plurality of documents is not limited to such a particular method.

For example, instead of clustering documents on the basis of feature elements extracted from the titles of the documents according to the above embodiment, clustering may also be performed according to URL addresses (after removing "http://", the remaining part is employed), updated date/time (without any restriction or within last one moth), or file sizes (the sizes of the Web pages in bytes). One of these items or some combination of these items may be employed in the clustering process. A desired item can be selected, for example, from a menu. In the case where a selected item is not included in a document, another item may be employed instead of the selected item. For example, when the title is selected as the item, if a Web page does not include a title, a URL address may be employed.

After performing the clustering using one of the methods, the judgment as to whether clusters should be merged or not is made by evaluating the similarity between the clusters under consideration in the manner described above.

For example, let us consider an example in which clustering is performed according to URL addresses. We assume herein that documents have been categorized into a cluster of a certain URL (URL1) and a cluster of another URL (URL1). We further assume that the cluster of URL1 includes documents D1, D2, D3, and D4, and the cluster of URL2 includes documents D2, D3, D4, and D5. In this case, documents which are commonly included in both clusters are D2, D3, and D4. The ratio of the number of common documents to the total number of documents is calculated, and it is determined according to the calculated ratio whether the cluster of URL1 and the cluster of URL2 should be merged or not.

Although in the above embodiment, the judgment as to whether clusters should be merged or not is made by comparing the ration (%) of the number of documents commonly included in clusters under consideration to the total number of documents to a predetermined threshold value (%), the manner of the judgment is not limited to that. For example, the judgment as to whether clusters should be merged or not may be made in accordance with the number of common documents relative to the numbers of documents included in the respective clusters.

When the judgment as to whether to merge clusters is made on the basis of the number of clusters, the threshold value may be represented in the number of clusters. For example, when the total number of document is 10, if it is desired to perform merging when the number of common documents is equal to greater than 7, then the threshold value TH is set to 7 and TH1 to 9. In this case, when the number of common documents is equal to or greater than 9, the cluster name of a resultant cluster obtained via the cluster merging process is expressed in the AND form, while when the number of common documents is within the range from 7 to 8, the cluster name of a resultant cluster is expressed in the OR form. Note that the above threshold values used herein or in the previous embodiment are given as mere examples, and they are not limited to those specific examples.

In the above embodiment, different documents D1, D2, . . . , D7 are categorized. The embodiment may also be applied to the case where a single document is divided into a plurality of contents (into parts having their own themes) and the respective contents are categorized. Herein, let us assume that contents are given by dividing a single document at respective titles into plural parts each describing their own particular themes.

For example, if it is assumed that the documents D1, D2, . . . , D7 shown in FIG. 10 are parts of the same single document, these documents D1, D2, . . . , D7 can be regarded as contents in the above-described sense. In this case, the respective contents include titles T1, T2, . . . , T7 and main bodies A1, A2, . . . , A7.

As described above, the present invention may be applied to the case when a signal document is divided into a plurality contents, then the contents are categorized into clusters, and finally similar clusters in the obtained clusters are merged.

Furthermore, the present embodiment may also be applied to a plurality of documents obtained via a general retrieval service. In this case, the clustering process is first performed for a large number of documents obtained via the retrieval, and the cluster merging process is then performed for the result of the clustering process. Thereafter, the process described above may be performed upon the clusters obtained via the cluster merging process so that it can be easily see which clusters have been merged together into which clusters and see the degrees of the relations.

A program used to execute the above-described document categorizing process according to the present embodiment may be stored on a storage medium such as a floppy disk, an optical disk, or a hard disk. Note that such a storage medium also falls within the scope of the present invention. The program may also be obtained via a network.

The invention claimed is:

1. A document categorizing method for categorizing a plurality of documents in an electronic system according to semantic similarity, said method comprising:
    obtaining a plurality of clusters of documents, each cluster having a distinctive name;
    evaluating a degree of relation between at least two clusters by evaluating the similarity between the evaluated clusters based on the documents included in the respective evaluated clusters;
    merging the evaluated clusters into a new combined cluster when their degree of relation is determined to be not less than a predetermined first value; and
    assigning a new name to said new combined cluster based on the degree of relation between its constituent evaluated clusters;
wherein:
    if the degree of relation of said constituent evaluated clusters is less then a second predetermined value, which is greater than said first predetermined value, the new name assigned to said new combined cluster conforms to a first naming convention indicative of a degree of relation between said first and second predetermined values; and
    if the degree of relation of said constituent evaluated clusters is not less then said second predetermined value, the new name assigned to said new combined cluster conforms to a second naming convention indicative of a degree of relation not less than said second predetermined value; and
wherein:
    said first naming convention includes a concatenation of at least a name segment of each of said constituent evaluated clusters with a first delimiter inserted between the concatenated name segments; and
    said second naming convention includes a concatenation of at least a name segment of each of said constituent evaluated clusters with a second delimiter, different from said first delimiter, inserted between the concatenated name segments.

2. The document categorizing method of claim 1, wherein said second delimiter is a blank space.

3. The document categorizing method of claim 1, wherein the full name of said constituent evaluated clusters are concatenated in said first and second naming conventions.

4. A document categorizing method for categorizing a plurality of documents in an electronic system according to semantic similarity, said method comprising:
    obtaining a plurality of clusters of documents, each cluster having a distinctive name;
    evaluating a degree of relation between at least two clusters by evaluating the similarity between the evaluated clusters based on the documents included in the respective evaluated clusters;
    merging the evaluated clusters into a new combined cluster when their degree of relation is determined to be not less than a predetermined first value; and
    assigning a new name to said new combined cluster based on the degree of relation between its constituent evaluated clusters;
wherein:
    if the degree of relation of said constituent evaluated clusters is less then a second predetermined value, which is greater than said first predetermined value, the new name assigned to said new combined cluster conforms to a first naming convention indicative of a degree of relation between said first and second predetermined values; and
    if the degree of relation of said constituent evaluated clusters is not less then said second predetermined value, the new name assigned to said new combined cluster conforms to a second naming convention indicative of a degree of relation not less than said second predetermined value; and
wherein said new combined cluster constitutes a cluster combination, said method further comprising:
    determining a degree of relation between a previously uncombined cluster within said plurality of said clusters with said cluster combination by evaluating their similarity based on the documents included in said uncombined cluster and said cluster combination;
    merging the evaluated uncombined cluster and the evaluated cluster combination into a newer combined cluster when their degree of relation is determined to be not less than said predetermined first value;

assigning a newer name to said newer combined cluster based on the degree of relation between its constituent evaluated previously uncombined cluster and evaluated cluster combination, wherein if their degree of relation is less then said second predetermined value, the newer name assigned to said newer combined cluster conforms to a third naming convention, and wherein if their degree of relation is not less then said second predetermined value, the newer name assigned to said newer combined cluster conforms to a fourth naming convention.

5. The document categorizing method of claim 4, wherein:

said third naming convention includes a concatenation of a first part including at least a name segment of the constituent previously uncombined cluster and a second part including the full name of the constituent combined cluster enclosed within parenthesis, and includes said first delimiter inserted between the concatenated first and second parts; and said fourth naming convention includes a concatenation of a first part including at least a name segment of the constituent previously uncombed cluster and a second part including the full name of the constituent combined cluster enclosed within parenthesis, and includes said second delimiter inserter between the concatenated first and second parts.

6. A document categorizing method for categorizing a plurality of documents in an electronic system according to semantic similarity, said method comprising:

obtaining a plurality of clusters of documents, each cluster having a distinctive name;

evaluating a degree of relation between at least two clusters by evaluating the similarity between the evaluated clusters based on the documents included in the respective evaluated clusters;

merging the evaluated clusters into a new combined cluster when their degree of relation is determined to be not less than a predetermined first value; and assigning a new name to said new combined cluster based on the degree of relation between its constituent evaluated clusters;

wherein:

if the degree of relation of said constituent evaluated clusters is less then a second predetermined value, which is greater than said first predetermined value, the new name assigned to said new combined cluster conforms to a first naming convention indicative of a degree of relation between said first and second predetermined values; and if the degree of relation of said constituent evaluated clusters is not less then said second predetermined value, the new name assigned to said new combined cluster conforms to a second naming convention indicative of a degree of relation not less than said second predetermined value; and wherein said new combined cluster constitutes a cluster combination, said method further comprising:

obtaining a plurality of said cluster combinations, each cluster combination having a distinctive name;

determining a degree of relation between at least two cluster combinations by evaluating the similarity between the evaluated cluster combinations based on the documents included in the respective evaluated cluster combinations;

merging the evaluated cluster combinations into a new combined cluster combination when their degree of relation is determined to be not less than said predetermined first value;

assigning a new name to said new combined cluster combination based on the degree of relation between its constituent cluster combinations, wherein if the degree of relation of its constituent cluster combinations is less then said second predetermined value, the new name assigned to said new cluster combination conforms to a fifth naming convention indicative of a degree of relation between said first and second predetermined values, and wherein if the degree of relation of its constituent cluster combinations is not less then said second predetermined value, the new name assigned to said new combined cluster combination conforms to a sixth naming convention indicative of a degree of relation not less than said second predetermined value.

7. The document categorizing method of claim 6, wherein:

said fifth naming convention includes a concatenation of the full name of each evaluated cluster combination, with each full name enclosed within parenthesis and separated by said first delimiter; and said sixth naming convention includes a concatenation of the full name of each evaluated cluster combination, with each full name enclosed within parenthesis and separated by said second delimiter.

8. A machine readable memory medium having machine executable instructions for categorizing a plurality of documents in an electronic system according to semantic similarity, said machine readable memory medium comprising:

obtaining a plurality of clusters of documents, each cluster having a distinctive name;

evaluating a degree of relation between at least two clusters by evaluating the similarity between the evaluated clusters based on the documents included in the respective evaluated clusters merging the evaluated clusters into a new combined cluster when their degree of relation is determined to be not less than a predetermined first value; and assigning a new name to said new combined cluster based on the degree of relation between its constituent evaluated clusters;

wherein:

if the degree of relation of said constituent evaluated clusters is less then a second predetermined value, which is greater than said first predetermined value, the new name assigned to said new combined cluster conforms to a first naming convention indicative of a degree of relation between said first and second predetermined values; and if the degree of relation of said constituent evaluated clusters is not less then said second predetermined value, the new name assigned to said new combined cluster conforms to a second naming convention indicative of a degree of relation not less than said second predetermined value; and wherein:

said first naming convention includes a concatenation of at least a name segment of each of said constituent evaluated clusters with a first delimiter inserted between the concatenated name segments; and said second naming convention includes a concatenation of at least a name segment of each of said constituent evaluated clusters with a second delimiter, different from said first delimiter, inserted between the concatenated name segments.

9. The machine readable memory medium of claim 8, wherein said second delimiter is a blank space.

10. The machine readable memory medium of claim 8, wherein the full name of said constituent evaluated clusters are concatenated in said first and second naming conventions.

11. A machine readable memory medium having machine executable instructions for categorizing a plurality of documents in an electronic system according to semantic similarity, said machine readable memory medium comprising:
 obtaining a plurality of clusters of documents, each cluster having a distinctive name;
 evaluating a degree of relation between at least two clusters by evaluating the similarity between the evaluated clusters based on the documents included in the respective evaluated clusters;
 merging the evaluated clusters into a new combined cluster when their degree of relation is determined to be not less than a predetermined first value; and
 assigning a new name to said new combined cluster based on the degree of relation between its constituent evaluated clusters;
 wherein:
  if the degree of relation of said constituent evaluated clusters is less then a second predetermined value, which is greater than said first predetermined value, the new name assigned to said new combined cluster conforms to a first naming convention indicative of a degree of relation between said first and second predetermined values; and
  if the degree of relation of said constituent evaluated clusters is not less then said second predetermined value, the new name assigned to said new combined cluster conforms to a second naming convention indicative of a degree of relation not less than said second predetermined value; and
 wherein said new combined cluster constitutes a cluster combination, said machine readable memory medium further comprising:
 determining a degree of relation between a previously uncombined cluster within said plurality of said clusters with said cluster combination by evaluating their similarity based on the documents included in said uncombined cluster and said cluster combination;
 merging the evaluated uncombined cluster and the evaluated cluster combination into a newer combined cluster when their degree of relation is determined to be not less than said predetermined first value;
 assigning a newer name to said newer combined cluster based on the degree of relation between its constituent evaluated previously uncombined cluster and evaluated cluster combination, wherein if their degree of relation is less then said second predetermined value, the newer name assigned to said newer combined cluster conforms to a third naming convention, and wherein if their degree of relation is not less then said second predetermined value, the newer name assigned to said newer combined cluster conforms to a fourth naming convention.

12. The machine readable memory medium of claim 11, wherein:
 said third naming convention includes a concatenation of a first part including at least a name segment of the constituent previously uncombined cluster and a second part including the full name of the constituent combined cluster enclosed within parenthesis, and includes said first delimiter inserted between the concatenated first and second parts; and
 said fourth naming convention includes a concatenation of a first part including at least a name segment of the constituent previously uncombed cluster and a second part including the full name of the constituent combined cluster enclosed within parenthesis, and includes said second delimiter inserter between the concatenated first and second parts.

13. A machine readable memory medium having machine executable instructions for categorizing a plurality of documents in an electronic system according to semantic similarity, said machine readable memory medium comprising:
 obtaining a plurality of clusters of documents, each cluster having a distinctive name;
 evaluating a degree of relation between at least two clusters by evaluating the similarity between the evaluated clusters based on the documents included in the respective evaluated clusters;
 merging the evaluated clusters into a new combined cluster when their degree of relation is determined to be not less than a predetermined first value; and
 assigning a new name to said new combined cluster based on the degree of relation between its constituent evaluated clusters;
 wherein:
  if the degree of relation of said constituent evaluated clusters is less then a second predetermined value, which is greater than said first predetermined value, the new name assigned to said new combined cluster conforms to a first naming convention indicative of a degree of relation between said first and second predetermined values; and
  if the degree of relation of said constituent evaluated clusters is not less then said second predetermined value, the new name assigned to said new combined cluster conforms to a second naming convention indicative of a degree of relation not less than said second predetermined value; and
 wherein said new combined cluster constitutes a cluster combination, said memory medium further comprising:
 obtaining a plurality of said cluster combinations, each cluster combination having a distinctive name;
 determining a degree of relation between at least two cluster combinations by evaluating the similarity between the evaluated cluster combinations based on the documents included in the respective evaluated cluster combinations;
 merging the evaluated cluster combinations into a new combined cluster combination when their degree of relation is determined to be not less than said predetermined first value;
 assigning a new name to said new combined cluster combination based on the degree of relation between its constituent cluster combinations, wherein if the degree of relation of its constituent cluster combinations is less then said second predetermined value, the new name assigned to said new cluster combination conforms to a fifth naming convention indicative of a degree of relation between said first and second predetermined values, and wherein if the degree of relation of its constituent cluster combinations is not less then said second predetermined value, the new name assigned to said new combined cluster combination conforms to a sixth naming convention indicative of a degree of relation not less than said second predetermined value.

14. The machine readable memory medium of claim 13, wherein:
said fifth naming convention includes a concatenation of the full name of each evaluated cluster combination, with each full name enclosed within parenthesis and separated by said first delimiter; and
said sixth naming convention includes a concatenation of the full name of each evaluated cluster combination, with each full name enclosed within parenthesis and separated by said second delimiter.

15. A document categorizing apparatus for categorizing a plurality of documents in an electronic system according to semantic similarity, said apparatus comprising:
means for obtaining a plurality of clusters of documents, each cluster having a distinctive name;
means for evaluating a degree of relation between at least two clusters by evaluating the similarity between the evaluated clusters based on the documents included in the respective evaluated clusters;
means for merging the evaluated clusters into a new combined cluster when their degree of relation is determined to be not less than a predetermined first value; and
means assigning a new name to said new combined cluster based on the degree of relation between its constituent evaluated clusters;
wherein:
if the degree of relation of said constituent evaluated clusters is less then a second predetermined value, which is greater than said first predetermined value, the new name assigned to said new combined cluster conforms to a first naming convention indicative of a degree of relation between said first and second predetermined values; and
if the degree of relation of said constituent evaluated clusters is not less then said second predetermined value, the new name assigned to said new combined cluster conforms to a second naming convention indicative of a degree of relation not less than said second predetermined value; and
wherein:
said first naming convention includes a concatenation of at least a name segment of each of said constituent evaluated clusters with a first delimiter inserted between the concatenated name segments; and
said second naming convention includes a concatenation of at least a name segment of each of said constituent evaluated clusters with a second delimiter, different from said first delimiter, inserted between the concatenated name segments.

16. The document categorizing apparatus of claim 15, wherein said second delimiter is a blank space.

17. The document categorizing apparatus of claim 15, wherein the full name of said constituent evaluated clusters are concatenated in said first and second naming conventions.

18. A document categorizing apparatus for categorizing a plurality of documents in an electronic system according to semantic similarity, said apparatus comprising:
means for obtaining a plurality of clusters of documents, each cluster having a distinctive name;
means for evaluating a degree of relation between at least two clusters by evaluating the similarity between the evaluated clusters based on the documents included in the respective evaluated clusters;
means for merging the evaluated clusters into a new combined cluster when their degree of relation is determined to be not less than a predetermined first value; and
means for assigning a new name to said new combined cluster based on the degree of relation between its constituent evaluated clusters;
wherein:
if the degree of relation of said constituent evaluated clusters is less then a second predetermined value, which is greater than said first predetermined value, the new name assigned to said new combined cluster conforms to a first naming convention indicative of a degree of relation between said first and second predetermined values; and
if the degree of relation of said constituent evaluated clusters is not less then said second predetermined value, the new name assigned to said new combined cluster conforms to a second naming convention indicative of a degree of relation not less than said second predetermined value; and
wherein said new combined cluster constitutes a cluster combination, said apparatus further comprising:
means for determining a degree of relation between a previously uncombined cluster within said plurality of said clusters with said cluster combination by evaluating their similarity based on the documents included in said uncombined cluster and said cluster combination;
means for merging the evaluated uncombined cluster and the evaluated cluster combination into a newer combined cluster when their degree of relation is determined to be not less than said predetermined first value;
means for assigning a newer name to said newer combined cluster based on the degree of relation between its constituent evaluated previously uncombined cluster and evaluated cluster combination, wherein if their degree of relation is less then said second predetermined value, the newer name assigned to said newer combined cluster conforms to a third naming convention, and wherein if their degree of relation is not less then said second predetermined value, the newer name assigned to said newer combined cluster conforms to a fourth naming convention.

19. The document categorizing apparatus of claim 18, wherein:
said third naming convention includes a concatenation of a first part including at least a name segment of the constituent previously uncombined cluster and a second part including the full name of the constituent combined cluster enclosed within parenthesis, and includes said first delimiter inserted between the concatenated first and second parts; and
said fourth naming convention includes a concatenation of a first part including at least a name segment of the constituent previously uncombed cluster and a second part including the full name of the constituent combined cluster enclosed within parenthesis, and includes said second delimiter inserter between the concatenated first and second parts.

20. A document categorizing apparatus for categorizing a plurality of documents in an electronic system according to semantic similarity, said apparatus comprising:
means for obtaining a plurality of clusters of documents, each cluster having a distinctive name;

means for evaluating a degree of relation between at least two clusters by evaluating the similarity between the evaluated clusters based on the documents included in the respective evaluated clusters;

means for merging the evaluated clusters into a new combined cluster when their degree of relation is determined to be not less than a predetermined first value; and means for assigning a new name to said new combined cluster based on the degree of relation between its constituent evaluated clusters;

wherein:
- if the degree of relation of said constituent evaluated clusters is less then a second predetermined value, which is greater than said first predetermined value, the new name assigned to said new combined cluster conforms to a first naming convention indicative of a degree of relation between said first and second predetermined values; and
- if the degree of relation of said constituent evaluated clusters is not less then said second predetermined value, the new name assigned to said new combined cluster conforms to a second naming convention indicative of a degree of relation not less than said second predetermined value; and wherein said new combined cluster constitutes a cluster combination, said apparatus further comprising:

means for obtaining a plurality of said cluster combinations, each cluster combination having a distinctive name;

means for determining a degree of relation between at least two cluster combinations by evaluating the similarity between the evaluated cluster combinations based on the documents included in the respective evaluated cluster combinations;

means for merging the evaluated cluster combinations into a new combined cluster combination when their degree of relation is determined to be not less than said predetermined first value;

means for assigning a new name to said new combined cluster combination based on the degree of relation between its constituent cluster combinations, wherein if the degree of relation of its constituent cluster combinations is less then said second predetermined value, the new name assigned to said new cluster combination conforms to a fifth naming convention indicative of a degree of relation between said first and second predetermined values, and wherein if the degree of relation of its constituent cluster combinations is not less then said second predetermined value, the new name assigned to said new combined cluster combination conforms to a sixth naming convention indicative of a degree of relation not less than said second predetermined value.

21. The document categorizing apparatus of claim 20, wherein:
- said fifth naming convention includes a concatenation of the full name of each evaluated cluster combination, with each full name enclosed within parenthesis and separated by said first delimiter; and
- said sixth naming convention includes a concatenation of the full name of each evaluated cluster combination, with each full name enclosed within parenthesis and separated by said second delimiter.

\* \* \* \* \*